(12) United States Patent
Hanna et al.

(10) Patent No.: US 7,434,421 B2
(45) Date of Patent: Oct. 14, 2008

(54) FIBERIZING APPARATUS

(75) Inventors: Terry Joe Hanna, Millersport, OH (US); Russell Donovan Arterburn, Athens, TN (US); James Melvin Higginbotham, Granville, OH (US); Michael D. Folk, Oregon, OH (US)

(73) Assignee: Johns Manville, Denver, CO (US)

( * ) Notice: Subject to any disclaimer, the term of this patent is extended or adjusted under 35 U.S.C. 154(b) by 590 days.

(21) Appl. No.: 10/624,865

(22) Filed: Jul. 22, 2003

(65) Prior Publication Data

US 2005/0241342 A1    Nov. 3, 2005

Related U.S. Application Data

(63) Continuation-in-part of application No. 08/929,836, filed on Sep. 15, 1997, now Pat. No. 7,194,874.

(51) Int. Cl.
*C03B 37/095* (2006.01)

(52) U.S. Cl. .......................................... 65/493; 65/495

(58) Field of Classification Search .................. 65/495, 65/493, 492, 474, 471
See application file for complete search history.

(56) References Cited

U.S. PATENT DOCUMENTS

| | | | | | |
|---|---|---|---|---|---|
| 3,628,930 | A | * | 12/1971 | Harris | 65/212 |
| 3,810,741 | A | * | 5/1974 | Stalego | 65/474 |
| 3,988,135 | A | * | 10/1976 | Coggin, Jr. | 65/496 |
| 4,612,027 | A | * | 9/1986 | Marra | 65/471 |

FOREIGN PATENT DOCUMENTS

EP        1193225 A2 *   4/2002

* cited by examiner

*Primary Examiner*—Richard Crispino
*Assistant Examiner*—Queenie Dehghan
(74) *Attorney, Agent, or Firm*—Robert D. Touslee

(57) ABSTRACT

A fiberizing apparatus for converting molten material into continuous fibers has an internal support structure to minimize high temperature creep and sagging of a tip plate, the reinforcing structure forming at least about 16 internal cells and the hole pattern in a bushing screen is engineered such that the hole area in each screen area above each of the at least 16 cells controls the amount of molten material flowing into each cell to produce a substantially improved tip plate temperature profile and fiberizing efficiency.

72 Claims, 14 Drawing Sheets

FIBERIZING APPARATUS

This application is a continuation-in-part of U.S. patent application Ser. No. 08/929,836 filed Sep. 15, 1997 now U.S. Pat. No.7,194,874 The present invention involves an improved bushing apparatus for making fibers from a molten material, particularly inorganic molten material such as various glasses, and an improved method of making and using fiberizing bushings to manufacture fibers, preferably inorganic fibers such as glass fibers.

In the manufacture of continuous fibers from a molten material like a glass, the glass is often generated by a tank furnace and distributed to a plurality of fiberizing bushings via one or more channels in one or more bushing legs connected to the channel(s). Each bushing leg comes off the channel at about 90 degrees and contains a plurality of spaced apart bushings. The molten material exiting the tank furnace into the channel(s) is much hotter than desired for fiberizing and the molten material entering the bushing legs is typically hotter than desired for fiberizing, particularly when the furnace is being run close to designed capacity.

Precious metal bushings for making glass fibers are well known. Many types and designs of bushings exist for converting molten glass into continuous glass fiber and products. Typical types of bushings are shown in U.S. Pat. Nos. 3,512,948; 4,155,732; 4,272,271; 4,285,712 and 6,453,702 the disclosures of which are hereby incorporated by reference. The bushings shown in these patents teach the use of a perforated plate or screen, welded to the end walls and side walls at some distance above a tip plate containing hundreds of nozzles or tips where molten glass, as it emerges from the orifice of each tip, is converted to a continuous glass fiber in a known manner. These patents teach that the purpose of the screen is to condition the glass, homogenizing the chemistry and temperature, and to prevent pieces of refractory or unmelted glass from reaching the tip plate. Most, if not all, of these references teach using a uniform hole pattern with uniform hole size over the entire surface of the tip plate. Normally, the screens taught by these references improve the temperature profile of the tip plate, i.e. produce a more uniform temperature in the molten glass just above the tip plate in all directions than if the screen were not present.

These bushings work well as long as the molten material entering the bushings is fairly uniform in temperature, but often there is at least a streak of molten material in the flow that is significantly hotter than the molten material next to the walls of the channel. This hotter material has a lower viscosity than the cooler material next to the walls. When it enters the bushing, always in the first position next to the channel and sometimes in the second position of a bushing leg, it flows through holes in a conventional screen, perforated plate, in the bushing faster than the cooler material. This causes the temperature profile of the tip plate spaced below the screen to be non-uniform. When this happens, a generally central portion of the length of the bushing tip plate runs considerably hotter than the ends. This hotter central portion can be offset to the down stream end due to the velocity vector of the hotter stream of glass. The hot glass has a higher velocity down center of the bushing leg and down the orifices to the bushings than the colder glass next to the walls and bottom.

The first, and sometimes also the second, bushing position in each of the legs, the positions next to, closest to, the channel, are called channel positions. The channel position(s) in each leg have the most glass passing over it/them than any of the remaining bushings in the leg, and the velocity of the molten glass passing over the channel positions can be significantly higher than it is further down the leg. When hot glass, hotter than desired, dives into the orifices feeding the channel positions, it substantially increases the break rate of the bushing and also increases the variation of the fiber diameters of the fiber coming from the bushing due to the higher temperature gradient this condition causes across the tip plate, i.e. tip plate temperature profile.

Other factors cause the molten glass flow into and down through the bushing to become non-uniform. The colder refractory lining the orifice in the bottom of the forehearth legs through which the molten glass flows to the bushing draws off heat from the contacting glass leaving the glass around the periphery of the bushing colder than in the center portion. Also, heat loss from the hot bushing is usually greater at the corners due to the bushings higher exposed surface area around the corners. These temperature differences in the molten glass affect the viscosity of the glass and cause a less than desirable tip plate temperature/viscosity profile. If the viscosity of the glass passing through each of the tips or orifices in the bottom of the bushing is not within the necessary range, or is close to the limits of the range, the glass will not fiberize properly and breakouts will occur causing a loss of production of the bushing for several minutes and a costly reduction in productivity.

The use of a screen having a non-uniform hole size and/or hole density is taught by U.S. Pat. No. 4,612,027, but this reference does not suggest using that screen for addressing the above described problem. This patent teaches making a bushing having a dripless tip area and a dripping tip area in the tip plate of the bushing. The bushing taught by this patent has a screen that has much less resistance to flow in the center portion of the screen than the portion or area adjacent each end of the screen, i.e. the center portion of the screen has much larger holes and/or a higher hole density than the areas of the screen adjacent each end of the bushing. Also, the bushings taught by this patent must have vertical walls extending from the top of the tip plate to the bottom of the screen to separate the areas of different rates of molten glass flow to function as taught. This patent accepts that the tips on the outer periphery break out more frequently and teaches a bushing that tolerates such frequent fiber breaks and lowers fiberizing efficiency.

U.S. Pat. No. 3,810,741 discloses fiberizing bushings having a heater strip in the form of a relatively thick plate with a plurality of holes therein. The heater strip plate has different sized holes in end portions of the plate than the holes in a center portion of the plate for the purpose of facilitating uniform flow of glass regardless of glass viscosity. In addition to varying the diameter of the holes, the thickness of the perforated heater strip is varied to cause changes in the electrical heating to compensate for the different viscosity of the glass in different parts of the bushing. Substantial lateral flow of molten glass can occur below the heater strip in these bushings and frustrates optimum control of tip plate temperature profile.

SUMMARY OF THE INVENTION

It has been discovered that if the hole density, number of holes per unit area, and/or the hole diameter, is decreased in the screen in the area above where the hotter glass flow negatively affects the tip plate temperature profile, the temperature profile of the tip plate or orifice plate is greatly improved. Hereafter whenever tip plate is used it is to be understood that this term also refers to an orifice plate, both being the bottom plate of a bushing having holes therein through which molten glass flows to form individual fibers. It has also been discovered that when internal precious metal supports are arranged to produce compartments, cells, inside the bushing between the screen and the tip plate or orifice plate, these supports not only greatly reduce the rate of sag of the screen and tip plate during the life of the bushing, but also add a further means of controlling the flow of molten glass between the screen and the tip or orifice plate, thus enabling the flow of molten glass to the tip plate or orifice plate to be substantially better engineered to substantially better achieve a uniform temperature of glass entering and exiting the tips or orifices in the tip plate. The hole area, hole density and/or hole size, in the screen above each cell can now be engineered to produce a substantially improved tip plate profile than heretofore possible because the supports greatly reduce lateral flow of the molten glass after the latter passes through the screen. Substantial lateral flow of molten glass occurs beneath the screen in prior art bushings because hotter, lower viscosity, glass seeks a path of least resistance that is towards even hotter glass.

These discoveries have led to bushings for the channel positions, and all bushing positions as well, that allow fiberization with much improved efficiency, including in the channel positions, compared to using conventional bushings in these positions. This invention also reduces the fiber diameter variation of the fibers produced from all positions, including the channel positions.

The present invention includes a bushing for making fibers from a molten material comprising at east one sidewall and a tip plate through which molten glass flows to form the fibers. The bushing comprises a screen, perforated plate, having a plurality of holes (orifices) therethrough and mounted on the interior of the bushing spaced above the top of the tip plate or orifice plate. The screen has holes therethrough and can either be attached to at least one wall, or can simply lay on top of internal supports without being attached initially to any other bushing part. The screen lays or is mounted on the top of, or very near, internal supports that form at least 12, more preferably at least 24 and most preferably at least 34 or more cells between the screen and the tip plate. The screen has a hole area above each of the cells and the hole density and/or hole diameters in each of these hole areas are engineered to produce a substantially more uniform temperature and viscosity of molten glass exiting the tips, or orifices, across the tip plate than produced by prior art bushings. in addition, for those bushing screens intended for channel positions a generally mid or central portion of the screen has a hole area per unit area of screen that is smaller than the hole area per unit area of screen of end portions on either side of the mid or central portion The present invention also includes the method of making these inventive bushings and the method of using these novel bushings to make fibers, including using the novel bushings in channel positions.

While this solution solves the channel position tip plate temperature gradient problem, using a different bushing screen design in the channel positions than is used in the non-channel positions requires that many more bushings be inventoried. This is aggravated by needing two types of the bushings made according to the present invention for the channel positions in addition to the differently designed bushings for the other positions. Two types of bushings are needed for the channel positions to maintain the same front to back orientation of the bushings on both sides of the channel. The same orientation is important to fit auxiliary equipment for the bushing like water-cooling lines and thermocouple connections. The area of the screen where smaller and/or fewer holes/unit area are placed for decreased flow on channel positions is frequently not in the exact center of the bushing, lengthwise, so bushings designed for the channel position on one side of the channel will not work for the channel positions on the opposite side of the channel. These bushings are made from precious metal alloys, such as 78 percent platinum and 28 percent rhodium, which are more expensive than gold. This increase in bushing inventory and precious metal inventory required, compared to a situation where there is only one type of bushing, ties up substantial additional valuable capital assets from use elsewhere in the operation.

The present invention also includes a bushing for making fibers from a molten material comprising at least one sidewall, a plurality of supports located above the a plate and below a screen and forming at least 12 cells between the screen and the tip plate through which molten glass flows to form the fibers, and a first screen having engineered hole size and density areas above each internal cell. The first screen is spaced above the tip plate, on the internal supports forming cells and is attached to at least one sidewall. In this embodiment a second screen having holes therethrough is placed on top of said first screen with at least some of the holes in the second screen aligning with holes in the first screen, but the area of the holes per unit area of screen in the second screen is less than the area of holes per unit area of screen in the first screen. This bushing is used in channel positions. The present invention also includes a method for making fibers using such a bushing.

The present invention also includes the use of a screen or perforated plate (screen) having smaller hole sizes and/or hole densities in at least one area of the screen than the hole diameter or size and/or hole density in the remainder of the screen with bushings designed for use in non-channel positions to produce a bushing that works well in channel positions on either side of the channel. The inventive screen lies on top of the conventional screen in the bushing. The resultant bushing is also a part of the present invention, as are the methods for making bushings for a channel position. This invention greatly reduces the number of new bushings and the amount of precious metal that must be inventoried in each plant or for each furnace.

This bushing has a first screen, normally welded to the sidewalls and end walls of the bushing, or to the flange of the bushing, in a normal way. The first screen has engineered hole size and hole density in the areas of the screen containing holes above the interior cells, engineered to produce optimum fiberization in non-channel positions. The bushing also has a second screen lying on top of the first screen, the second screen having a hole size and/or hole density in the areas above the cells in a center portion being smaller or less than the hole size and/or hole density in areas above the cells in end portions of the screen. The holes in the second screen align with holes in the first screen, but may be smaller than the holes below in the first screen, and there may be fewer holes in the second screen than in the first screen. The second screen does not have to be welded to any part of the bushing, but it can be tacked, pinned, riveted or otherwise attached in one or more places to keep it from moving and to maintain acceptable alignment of the holes in the first and second screens as they sag with age, albeit at a lower rate than conventional bushings.

The bushing of the present invention is made by welding a screen having a non-uniform hole pattern, hole density and/or hole diameter into a standard bushing, or by laying a screen having a non-uniform hole pattern, density and/or hole size on top of a conventional screen of a conventional bushing. In all embodiments of the present invention, the percent of hole area of top or second screen, based on the total area of the top screen, is significantly smaller than the percent of hole area of the first or bottom screen, based on the total area of the first or bottom screen. By significantly smaller or lower is meant at least about 5 percent, preferably at least about 10 percent, and most preferably at least about 20 percent, such as 25 percent, 30 percent or more.

When the inventive screen is not symmetrical from end to end, which it can be, the screen can be laid in face up to make a bushing for a channel position on one side of the channel or flipped over and laid in face down to make an inventive bushing for a channel position on the other side of the channel. Thus, in one embodiment of the present invention, only one kind of bushing and one kind of additional lay-in screen need be inventoried. This reduces the amount of precious metal in new parts inventory at a plant or for each furnace substantially while solving the tip plate temperature gradient problem on channel, and sometimes second, positions.

The present invention also includes a method for making fibers from molten material using conventional fiber making processes except for the use of one or more of the bushings of the present invention in the manner described in detail below. When the term hole density is used herein, it means the number of holes per square inch of screen area in the portion of the screen being described. While round holes are preferred and are used to describe the present invention, other shapes of holes can be used in the present invention. In some embodiments, the percent of hole or open area in the central or center portion of the screen of the invention is significantly less than the percent of hole or open area in the remainder of the screen. Hole density is directly proportional to percent open area in the portion of the screen being defined. The hole size, as used herein to describe the invention, means the diameter of the holes or the area of the holes if the holes are not circular, unless otherwise defined.

When the word "about" is used herein it is meant that the amount or condition it modifies can vary some beyond that so long as the advantages of the invention are realized. Practically, there is rarely the time or resources available to very precisely determine the limits of all the parameters of ones invention because to do would require an effort far greater than can be justified at the time the invention is being developed to a commercial reality. The skilled artisan understands this and expects that the disclosed results of the invention might extend, at least somewhat, beyond one or more of the limits disclosed. Later, having the benefit of the inventors disclosure and understanding the inventive concept and embodiments disclosed including the best mode known to the inventor, the inventor and others can, without inventive effort, explore beyond the limits disclosed to determine if the invention is realized beyond those limits and, when embodiments are found to be without any unexpected characteristics, those embodiments are within the meaning of the term about as used herein. It is not difficult for the artisan or others to determine whether such an embodiment is either as expected or, because of either a break in the continuity of results or one or more features that are significantly better than reported by the inventor, is surprising and thus an unobvious teaching leading to a further advance in the art.

BRIEF DESCRIPTION OF SEVERAL VIEWS OF THE INVENTION

FIGS. 6A and 6B are blown up views of portions of the screen.

DETAILS

Figure 1:
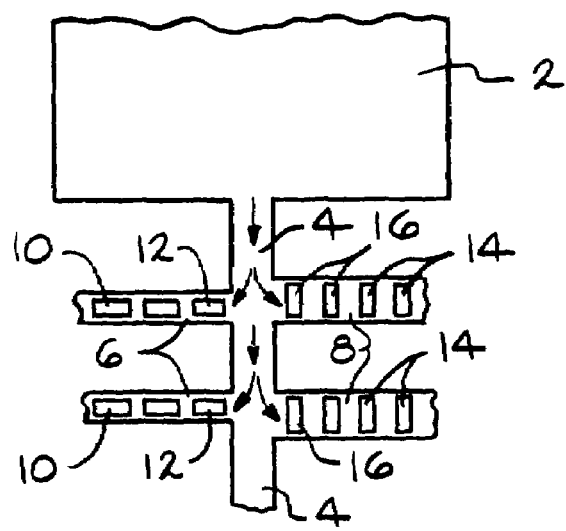
FIG. 1 is a vertical cross section of a portion of a typical fiber glass furnace showing a glass melting furnace or tank, a channel or forehearth, four bushing legs and numerous spaced openings in the bottom of each leg for feeding bushings, bushing positions.

Referring to FIG. 1, which is a horizontal cross section taken below the glass line of a portion of a conventional direct glass melting and fiberizing system, the batch is melted in a glass tank 2 and is refined in the downstream portion of the tank 2. Refining includes lowering the temperature of the molten glass significantly below the maximum temperature of the molten glass upstream in the tank 2 as is well known. To melt batch completely at a competitive rate, it is necessary that the molten glass reach a temperature several hundred degrees hotter than the fiberizing temperature of the glass. Some of this excess temperature can be removed in the refining end of the melting tank, but the temperature of the molten glass is still too hot to fiberize when it enters one or more channels 4 when the tank is being pulled hard, i.e. at or near maximum capacity.

While FIG. 1 shows only one forehearth channel 4, that channel can be split into two or more channels to feed more bushings, or two or more channels can emerge from the tank 2. The channel 4 confines the molten glass on its journey to one or more bushing legs 6 and 8. Although the molten glass loses temperature as it flows through the refractory lined channel 4, at least when pulling a furnace at or near the maximum rate, the temperature of the molten glass remains too hot for good fiberization. When this condition exists, the glass in the center of the flow tends to be the hottest and runs faster than the cooler glass closer to the walls and the bottom of the channel. This hottest glass streak tends to dive into the first, and sometimes the second, orifices in the bottom of the legs, bushing positions 12 and 16. FIG. 1 shows two ways that bushings are typically oriented in the bushing legs 6 and 8. In legs 6, the bushing length is parallel to the length of the leg and in legs 8, the bushing length is perpendicular to the length of the leg. While two different orientations are shown here on the same fiberizing operation or furnace, normally the bushings would be oriented in the same direction in each leg of a fiberizing operation or furnace.

Mounted below each orifice in the leg and spaced apart are a plurality of conventional bushings, such as the bushing shown in FIGS. 2 and 3, for converting the molten glass into fibers. These bushings 18 include a flange 20 at the top of the bushing for sealing to a refractory bottom of the legs 6 and 8 and are centered under vertical orifices that measure about 16.5 to about 20 inches long and about 1-3 inches wide. The molten material such as glass flows down into the bushings 18 through these orifices.

Referring again to FIGS. 2 and 3, conventional bushings 18 also include a tip plate or orifice plate 22, usually having a plurality of tips 24 thereon. Some bushings do not have tips 24, but fiberize directly from the orifices in the orifice plate 22. The tip plate 22 is welded to bottom edges of sidewalls 26 and end walls 28. Top edges of the sidewalls 26 and end walls 28 are welded to the flange 20. A water-cooled tube loop 30 is mounted under the flange to freeze the molten material and form a seal with the refractory bottom of the legs 6 and 8.

The bushing 18 is normally made from platinum or a platinum-rhodium alloy in which the major portion is platinum when used to fiberize glass and other corrosive materials. The bushings are normally heated, usually electrically heated by their own resistance with power cables (not shown) connected to terminal ears 32 on each end of the bushing. The entire bushing assembly is mounted in an insulating refractory castable in a metal frame in a known manner. The metal frame connects to a superstructure of the fiberizing operation or furnace to hold the bushing 18 in place.

Figure 2:
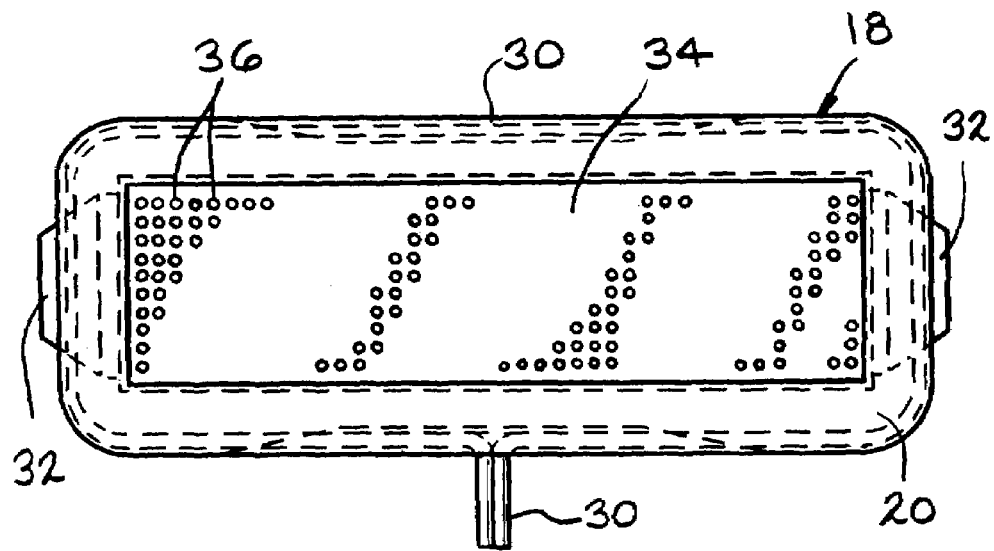
FIG. 2 is a plan view of a typical conventional tip type bushing for making continuous fiber from a molten material and having mounted therein a conventional bushing screen having uniform hole density and hole size.
Figure 3:
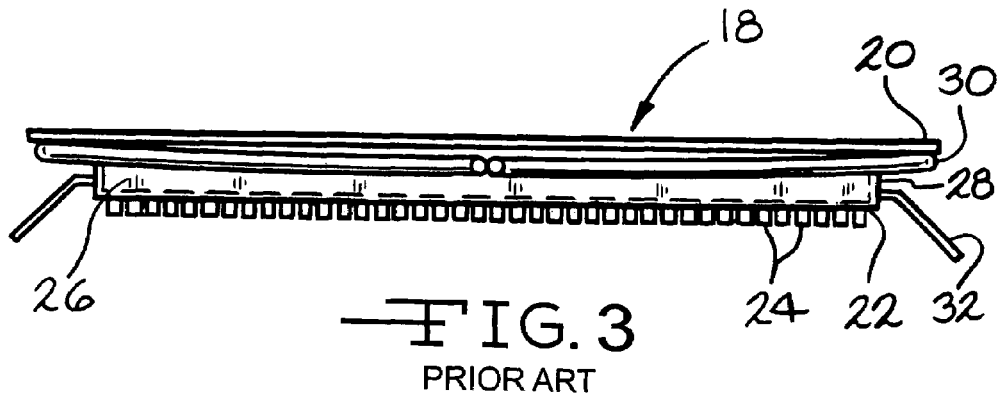
FIG. 3 is a front view of a conventional bushing shown in FIG. 2.

The conventional bushing 18 shown in FIGS. 2 and 3 also contains a screen or screen plate 34 whose edges are usually welded to the inside of the sidewalls 26 and the end walls 28, but the screen 34 can also be an integral part of the flange 20, or can lie over the flange 20. The screen plate 34 is spaced above the tip plate 22 by varying amounts, but typically the bottom surface of the screen 34 is about 1.9375 inches above the top surface of the tip plate 22. This spacing can be larger or smaller as shown in U.S. Pat. No. 6,196,029, the disclosure incorporated herein by reference. Also, this spacing can change with operating age since the screen usually operates at a higher temperature than the tip plate and sags more.

The screen 34, or perforated plate, has a plurality of holes or orifices 36 and is typically about 0.09-0.15 inch thick. The purpose of the screen is to catch any large pieces of refractory or other unmelted debris in the molten material and prevent them from getting to the tip plate 22 where they would interfere with molten glass getting to the tips, and to condition or homogenize the temperature, viscosity and chemistry of the glass. Typically the holes in a conventional bushing screen are about 0.053-0.057 inches in diameter and the hole density is about 80-120 holes per square inch.

The upstream end of the first orifice in each leg 6 or 8 is typically about 12-30 inches from the edge of the channel, depending upon the leg design and the orientation of the bushing in the leg. The hottest glass, and lowest velocity glass, running into the legs 6 and 8 tends to dive into the center portion of the first position in the leg, and on some legs also into the center of the second position. The hot streak of glass flows right on through the conventional bushing screen and down to the tips. The colder glass surrounds this hot glass such that the tips at the ends of the bushings in the channel positions, or around the periphery of the bushings when the bushing length is perpendicular to the leg, run colder. This is not desirable because the tips on the outer periphery tend to run colder anyway because of the cool air flowing into the fiber array. When the bushing is heated up to make the tips in the outer periphery run better, then the center of the bushing is too hot and runs fibers having a coarse fiber diameter or breaks out.

Figure 5:
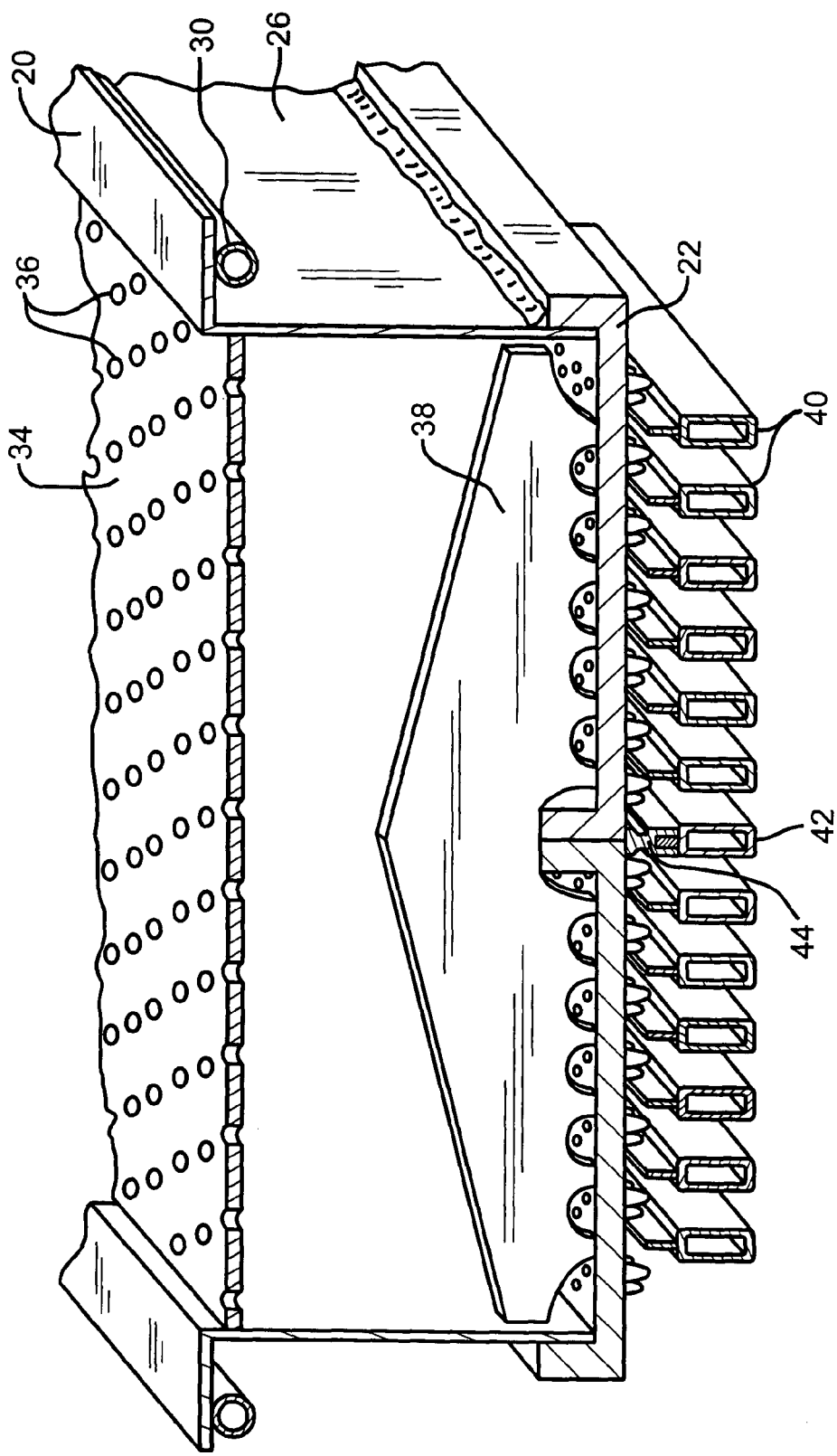
FIG. 5 is a crossectional view of a conventional tip type bushing, having a conventional screen plate having a uniform hole size and hole density and having internal supports for the tip plate.

The present invention solves these problems by changing the flow of glass through the screen plate to compensate for the different temperatures of molten material like glass flowing onto the screen plate. FIG. 5 is a cross section of a prospective view of a portion of a conventional bushing for making glass fiber. This bushing is like the bushing shown in FIGS. 2 and 3. In addition to the elements shown in FIGS. 2 and 3 and described above, FIG. 5 shows internal supports 38 which are welded to the top of the tip plate 22 to retard sagging of the tip plate 22 due to the high operating temperature and the head of molten glass pressing down on the tip plate. This figure also shows conventional finned water-cooled tubes 40 below the tips for cooling the tips and the molten glass forming the fiber. In the bushing shown, the center cooling tube 42 has two fins and a refractory piece 44 setting on and running along the tube 42 between the two fins to support the center of the tip plate along its length. The cooling tubes are supported by conventional hardware not shown here.

While the bushing described above is a cooling tube type bushing, the invention is equally useful on bushings that use other means of cooling such as well known blade like fins, well known forced air cooling, or only ambient air cooling. The method of cooling the tips, orifice plate and molten glass emerging from the tips or orifices in the orifice plate is not critical to the present invention.

Figure 6:
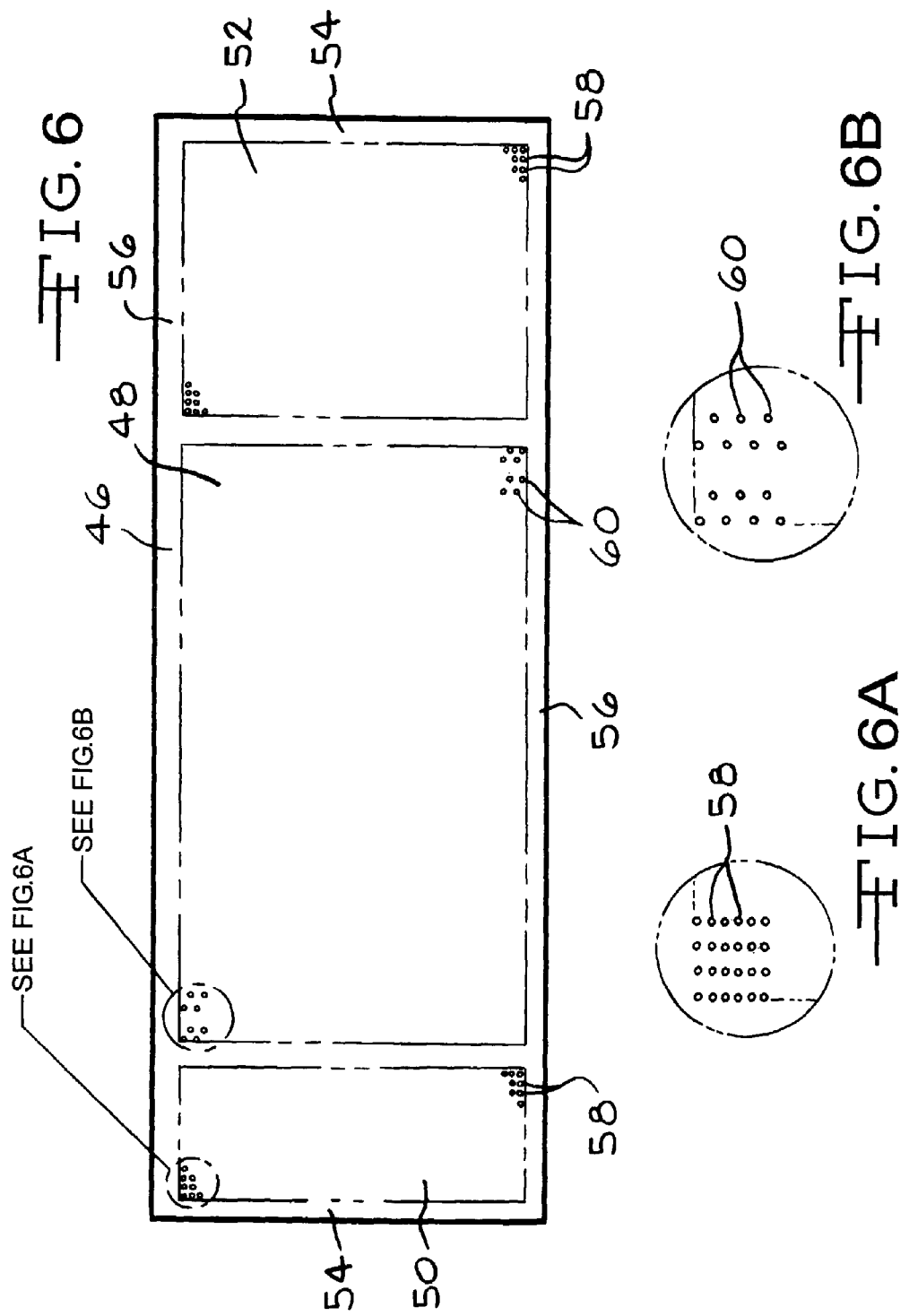
FIG. 6 is a plan view of a bushing screen design according to the present invention for use in the channel positions on either side of a channel in bushings whose length runs parallel to the length of the bushing leg.

FIGS. 6, 6A and 6B show a different screen configuration that can be used in the present invention. The screen 46 has a low flow center portion 48 which provides more resistance to flow than a first end portion 50 and an opposite end portion 52 which are medium flow portions. This screen 46 is especially useful for channel position bushings that are mounted in the legs with the length of the bushing running parallel with the length of the leg. In this embodiment of the present invention the holes are all about 0.55 inch in diameter, but the hole densities are different in different areas of the bushing. The hole density in the center portion 48 is about 20 holes per square inch while the hole densities in the two end portions are about 60 holes per square inch. The difference between the first end portion 50, the end that will be closest to the channel 4 and the opposite or second end portion 52 is that the first hole portion 50, is preferably smaller than the opposite end portion which will be farthest from the channel 4 when mounted or laid in a bushing and the bushing is installed in one of the bushing legs 6. In one embodiment of the screen 46, the dimension of the first end portion 50, along the length of the screen 46, is about 1.33 inch, the length of the center portion 48 is about 9.12 inch and the length of the second end portion 52 is about 2.05 inches in the. In this screen 46, a band of the screen around the periphery is free of holes. The end portions 54 of the band are preferably about 0.27 inch wide and the side portions 56 of the band are preferably about 0.37 inch, but other band widths would be suitable.

FIG. 6A is a plan view of a portion of the end portions 50 and 52 of the screen 46 showing how the holes in the end portions are arranged. The centers of the holes 58 preferably line up in both the length and width directions of the screen 46. The distance between the center lines of the rows of holes 58 in the length direction is preferably about 0.1 inch and the distance between the center lines of adjacent rows of holes in the screen width direction is preferably about 0.19 inch, but other hole arrangements and spacings can be used to achieve similar percent open area in the end portions 50 and 52 of the screen 46. Preferably, the percent open, hole, area in the two end portions 50 and 52 of the screen 46 is about 13.5 percent, but can be within the range of about 10 percent and about 16 percent.

FIG. 6B is a plan view of a portion of the center portion 48 of the screen 46 showing how the holes 60 in the center portion are preferably arranged. Compared with the rows of holes in the end portions 50 and 52, every third row of holes in the width direction of the screen are missing. Also, in the rows of holes in the width direction, the centers of the holes 60 are preferably twice as far apart. Also, the holes in each row in the width direction are offset from the holes in the adjacent row of the center portion 48. The distance between the centers of the holes in a row in the width dimension of the screen 46 is preferably about 0.2 inch, but other hole arrangements and spacings can be used to achieve similar percent open area in the center portion 60 of the screen 46. Preferably, the percent open area in the center portion 48 of the screen 46 is about 4.2 percent, but can be within the range of about 2.5 percent and about 6 percent.

The thickness of the screen 46 can be as thin as the capability of the equipment used to make the screen. The screen described in FIG. 6 had a thickness of about 0.009 to about 0.015 inch, preferably about 0.009 to about 0.011 inch. With the right equipment, a thinner screen can be made and will be suitable. The rate of flow of molten material through the screen can also be controlled by using different screen thicknesses, i.e. a thicker screen in the low flow portion of the screen than the thickness of the medium flow portions of the screen. This method of modifying the flow through the screen is not preferred when making fibers requiring precious metal screens because of the high cost of precious metal. The bushing screen can be made by drilling, punching or other means of making holes, slits or other openings in a precious metal sheet, or by weaving precious metal wire in a known manner to produce the openings prescribed above. When the term "holes" is used herein it is to be understood that any shape of hole is included.

The screen of the invention can be used in any bushing of the present invention in place of the non-channel bushing screen in which case the screen 46 would be welded to the sidewalls and/or end walls of the bushing, but it is often preferable to use the screen 46 as a lay in screen on top of the conventional screen 34. The bushing cannot be turned end for end to use on either side of the channel 4 because of auxiliary equipment used with the bushing, but screen 46 can be flipped over or turned end for end, or both, to make bushings for the channel positions on the opposite side of the channel 4, keeping the smaller medium flow end portion 50 closest to the channel 4 when the bushing is installed. This preferred mode of the invention eliminates much of the additional inventory by requiring only bushings of the present invention for non-channel positions and one or more screens 46 as shown in FIG. 6.

When preparing a bushing for a channel position, the screen 46 is simply placed inside the non-channel bushing to lie on top of the non-channel screen of the present invention. To economize on precious metal, the length of the screen 46 is shorter than the length of the lower screen to avoid placing blank metal over blank metal if the lower screen also has a blank band around its periphery that is similar to the blank band around the screen 46. When the screen 46 is placed into the bushing 18, making sure the short end portion 50 is on the channel end of the bushing, the screen 46 is centered on the screen 34 and slight adjustment is made to line up the holes in the screen 46 with holes in the screen 34 as well as possible. The screen 46 is the same on the top as the bottom so it can be flipped end over end, or turned around in a horizontal plane, if necessary, to place the short medium flow end portion 50 in the proper end of the bushing. The screen can be left loose; but to insure it doesn't shift during transporting to the furnace leg and installing, the screen 46 can be secured to the screen 34 at each end with a few tack welds, rivets or pins. This also helps maintain the alignment desired between the holes in the two screens. This aspect of the invention corrects the poor efficiency of the channel positions and fiber diameter variation problems when using without the need for three different types of bushings to be inventoried, the non-channel type and a different type for each side of the channel.

Figure 7:
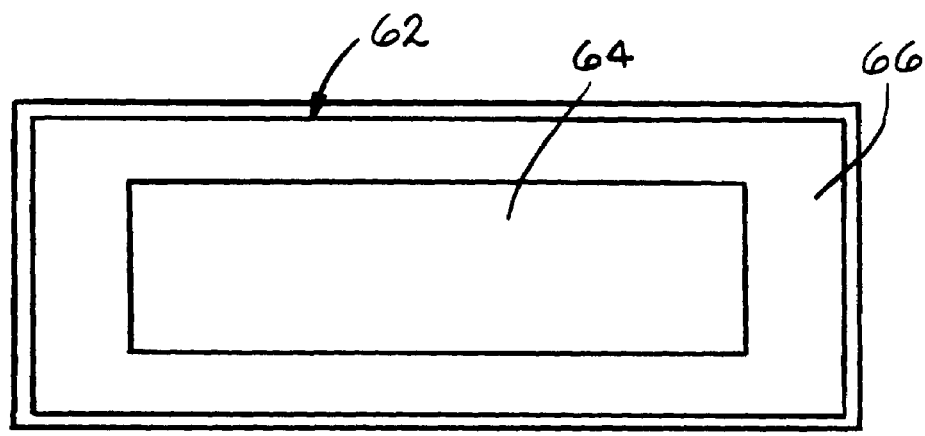
FIG. 7 is a plan view of a bushing screen design according to the present invention for use in bushings and particularly bushings for channel positions on either side of the channel in bushings whose length runs perpendicular to the length of the bushing leg.
Figure 8:
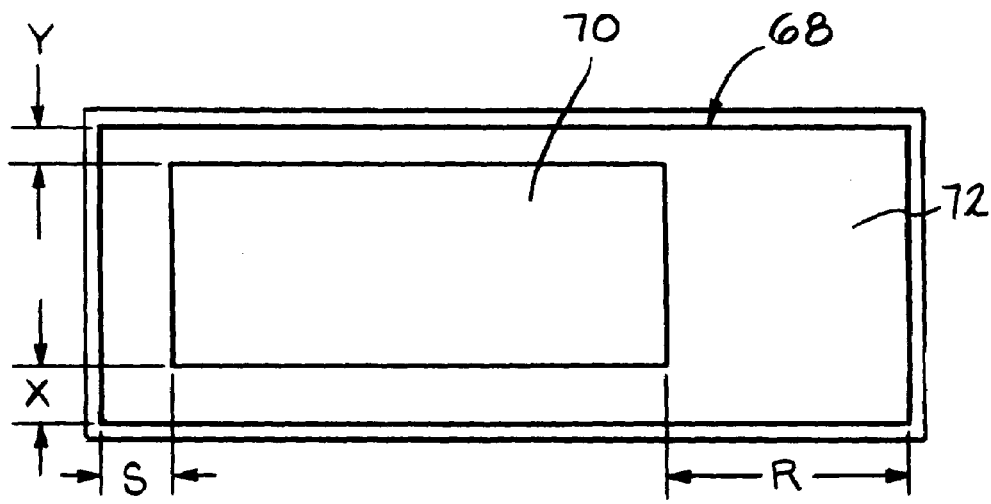
FIG. 8 is a plan view of another bushing screen design according to the present invention for use bushings and particularly for bushings in channel positions on either side of a channel on bushings whose length runs perpendicular to the length of the bushing leg.

FIGS. 7 and 8 show screens according to the present invention for use in channel position bushings oriented in a leg with the length of the bushing running perpendicular to the length of the leg, like positions 16 in FIG. 1. Screen 62 has a low flow rate portion 64 located in the symmetrical center of the screen 62, and a medium flow rate portion 66 completely surrounding portion 64. The screen 62 can also have an optional peripheral narrow band adjacent the outer edges (not shown) where there are no holes like that of screen 46 shown in FIG. 6.

Usually the hot streak of molten material like glass is not centered in the leg when it arrives at the channel position, but instead is offset to the downstream side from the furnace tank, having just turned almost 90 degrees to enter the leg. Therefore, a more preferred screen design for this type of bushing orientation is shown in FIG. 8. In this embodiment of the invention, a screen 68 has a low flow central portion 70 that is not symmetrically located in the center of the screen 68, but is offset towards the side of the leg that is downstream from the furnace tank and can also be offset in the direction of the upstream end of the leg. Describing this in more detail, a medium flow portion 72 of the screen surrounds the low flow center portion 70 in such a way that dimension X in FIG. 8 is greater than dimension Y and dimension R is greater than dimension S. In this screen 68, the shorter medium flow end portion 72 represented by dimension S would be closest to the leg sidewall that is furthest downstream from the furnace tank and the narrower medium flow side portion 72 represented by dimension Y would be closest to the channel 4, closest to the upstream end of the leg, when the bushing containing this screen is installed in the leg.

In the embodiments of the invention shown in FIGS. 7 and 8, the hole sizes, hole densities and percent open areas in the conventional screen and the low flow portion and medium flow portion of the new screens are the same as described for the screen shown in FIG. 6. Since the size of the furnace, the width of the channel and legs, the design of the entrance to the legs, the exit temperature of the molten material, the pull rate on the furnace and many other factors affect where the optimum location of the low flow portion of the screen should be located for optimum performance, some experimentation using the above disclosure as the guide is necessary for optimization.

The present invention has other uses to give a standard design bushing that is already built, or even in place making fiber, greater capability or better efficiency. Two of these applications include allowing a bushing designed to make coarse fiber to also make fine fiber without rebuilding and allowing a bushing designed to run one kind of glass also run another kind of glass having a completely different fiberizing temperature and temperature-viscosity curve.

A bushing designed to make 16 micron diameter fiber from a hot molten material like molten glass has orifice size in the tips to allow maximum flow rate for whatever fiber pulling speed is desired to achieve maximum productivity. This type of bushing will not run finer fiber like 13 micron and particularly 10 micron diameter at acceptable pull rates and efficiency because the bore in the tips is too large and the flow rate at fiberizing temperature through each tip is too great for the fiber pulling speed capability of the fiber pulling equipment, especially when making direct chop fiber. If customer needs switch from needing more fine fiber and less 16 micron or larger fiber, it has been very expensive to adjust manufacturing equipment to meet such a need. Normally a bushing lasts for 6 to 12 months or more and changing a bushing prematurely is very expensive. Also, once a direct melt bushing has been installed and run, removing it almost always damages the bushing to the extent that it must be cleaned up, remelted and rebuilt because it cannot be reused any other way. This is very expensive.

The present invention allows a bushing designed for 16 micron fiber to run 13 or even 10 micron fiber at close to optimum pull rates and efficiency. This embodiment of the invention is applicable to new, not yet installed direct melt bushings and to marble melt bushings, new or old and running. In this embodiment of the invention a new screen, according to the invention, is laid on top of the existing conventional screen to reduce the flow of molten material through the screen and thus to reduce the head of glass on the tip plate to that suitable to allow the tips with the larger bore to run fine fiber at a normal fiber pulling speed. In this embodiment, the new screen, to be laid on top of the conventional screen, will have a hole density and hole diameter that produces a substantially greater resistance to flow of the molten material than the conventional screen. The hole diameter and hole density can be uniform across the screen or it can be non-uniform to correct cold or hot end problems or other tip plate temperature profile problems if they exist by directing more or less glass into a problem area than into the non-problem areas to improve the profile. It is possible, with certain designs of bushing legs, that a woven wire screen according to the present invention can be inserted into the bushing while running by passing a small screen according to the present invention through the opening in the bottom of the leg and onto the center of the conventional screen in the bushing.

The screens shown in FIGS. 6, 6A, 6B, 7 and 8 can be used in any bushing of the present invention, bushings having a plurality of internal supports welded to the tip plate to reduce sag and, in cooperation with the bushing screen, to form compartments or cells in the interior of the bushing between the screen and the tip plate including the bushings shown in FIGS. 9-18C and also in marble or pellet melting bushings. The hole area per unit of screen area covering each cell can be engineered to produce a uniform tip plate temperature profile and optimum fiberizing efficiency using the method described later in this application.

Figure 4:
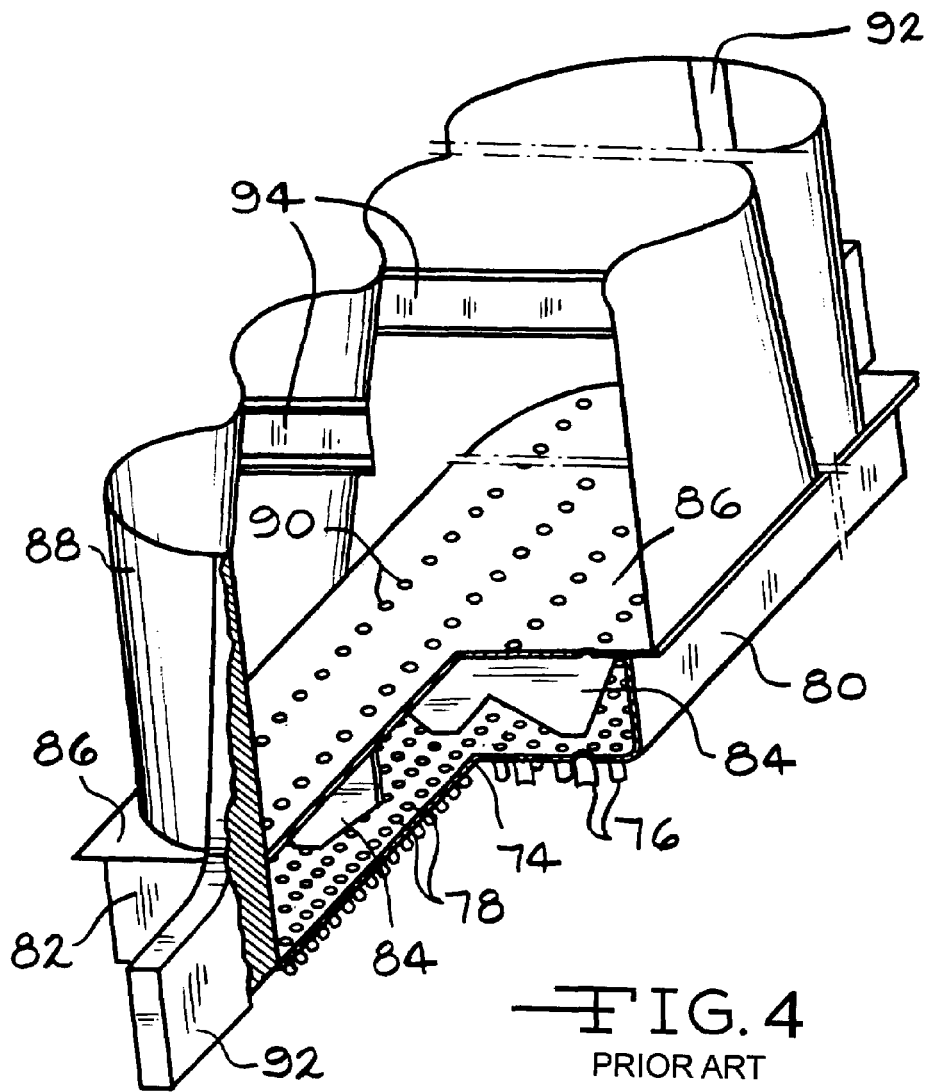
FIG. 4 is a schematic of a conventional marble or pellet melt bushing having a bushing screen with a uniform hole size and density.

FIG. 4 shows a conventional marble or pellet melt bushing having a tip plate 74 with tube tips 76 spaced apart and welded to the tip plate 74 around holes 78 in the tip plate. The tip plate 74 is welded to sidewalls 80 and end walls 82 and also to internal supports 84. A bottom surface of a screen plate 86 is welded to the tops of the sidewalls 80 and end walls 82 and to the internal supports 84. A curved enclosure 88, open at the top, is welded to a top surface of the screen 86. The screen 86 has holes or orifices 90 therethrough in the portion of the screen enclosed by enclosure 88. The bushing is made from precious metal like well known platinum-rhodium alloys when used to fiberize high temperature molten materials like glass and is heated by its own resistance by feeding electrical power to the terminals 92 on each end of the bushing. Optional braces 94 can be used to support the side walls of the enclosure to keep them apart during use. This bushing is mounted in a known way by surrounding it with insulating refractory in a stainless steel frame suitable for mounting to steel superstructure.

Glass pellets, marbles, beads, etc. are fed to this bushing after it is heated up and the screen plate 86 gets very hot and melts the glass. When the molten glass becomes hot enough that its viscosity allows it to run through the holes 90, the molten glass flows through the screen and on to the tip plate 74 where it flows through holes 78 and tips 76 to be fiberized in a known way. This bushing is designed not only to make particular fiber diameters, but also to operate on a particular glass, i.e. one having a particular temperature-viscosity relationship. To enable the bushing to melt the cold glass marbles, etc. at a good production rate, the screen plate 86 becomes much hotter than the fiberizing temperature of the molten glass. The size and density of the holes 90 are critical to optimizing the melt rate and fiberizing productivity of any particular fiber diameter and any particular glass. Therefore, a bushing designed for coarse fiber and a particular glass is not practical for making fine fiber or even coarse fiber from a significantly different glass composition.

The present invention allows a marble melt bushing designed for making coarse fiber to be easily and quickly modified, without rebuilding the bushing, so that it can be used to efficiently make finer fiber, and further to optimize the tip plate temperature profile. A screen plate having a substantially lower flow rate than the conventional screen plate 86 welded into the bushing and a flow rate appropriate to the desired fiber diameter and desired fiber pulling speed is inserted into the bushing and laid on top of the existing screen plate 86. This can be done by first stopping the feed of cold glass to the bushing, heating the bushing to about 50-100 degrees F. hotter than normal running temperature, draining as much of the molten glass as will run out, cooling the bushing, removing it to the workshop to install the screen. When the braces 94 are not used, the new screen according to the present invention can usually be installed while the bushing is in place and hot, though cooled some from operating temperature, after some of the molten glass has been drained from the bushing. When it is desired to use the bushing to again make coarse fiber, the lay-in screen of the present invention can be removed using the same procedure as used to install the new screen.

The present invention can also be used to allow a marble melt bushing designed for melting and fiberizing one type of glass having a particular temperature-viscosity curve to also melt and fiberize a substantially different glass having a higher melting temperature and a different temperature-viscosity curve than the glass for which the bushing was originally designed. A bushing for melting a higher temperature glass normally will have a screen having a lower flow rate through the screen by having smaller holes or a lower hole density or both. The reason is that as the melt temperature of the glass goes up, the desired screen temperature to get good melt rate, combined with the viscosity characteristics of the molten glass, tend to cause too rapid a flow rate of molten glass through the holes in the conventional screen than desired to run through the screen. This can be corrected by reducing the hole density, or preferably by reducing the size of the holes, and sometimes also the hole density. On a marble or pellet melt bushing the new screen can be installed while the bushing is hot by stopping the feed and letting all of the marbles, etc. melt before laying in the screen. It is most desirable to let the molten glass above the original screen to drain down through the screen before inserting the screen of the present invention.

Figure 9:
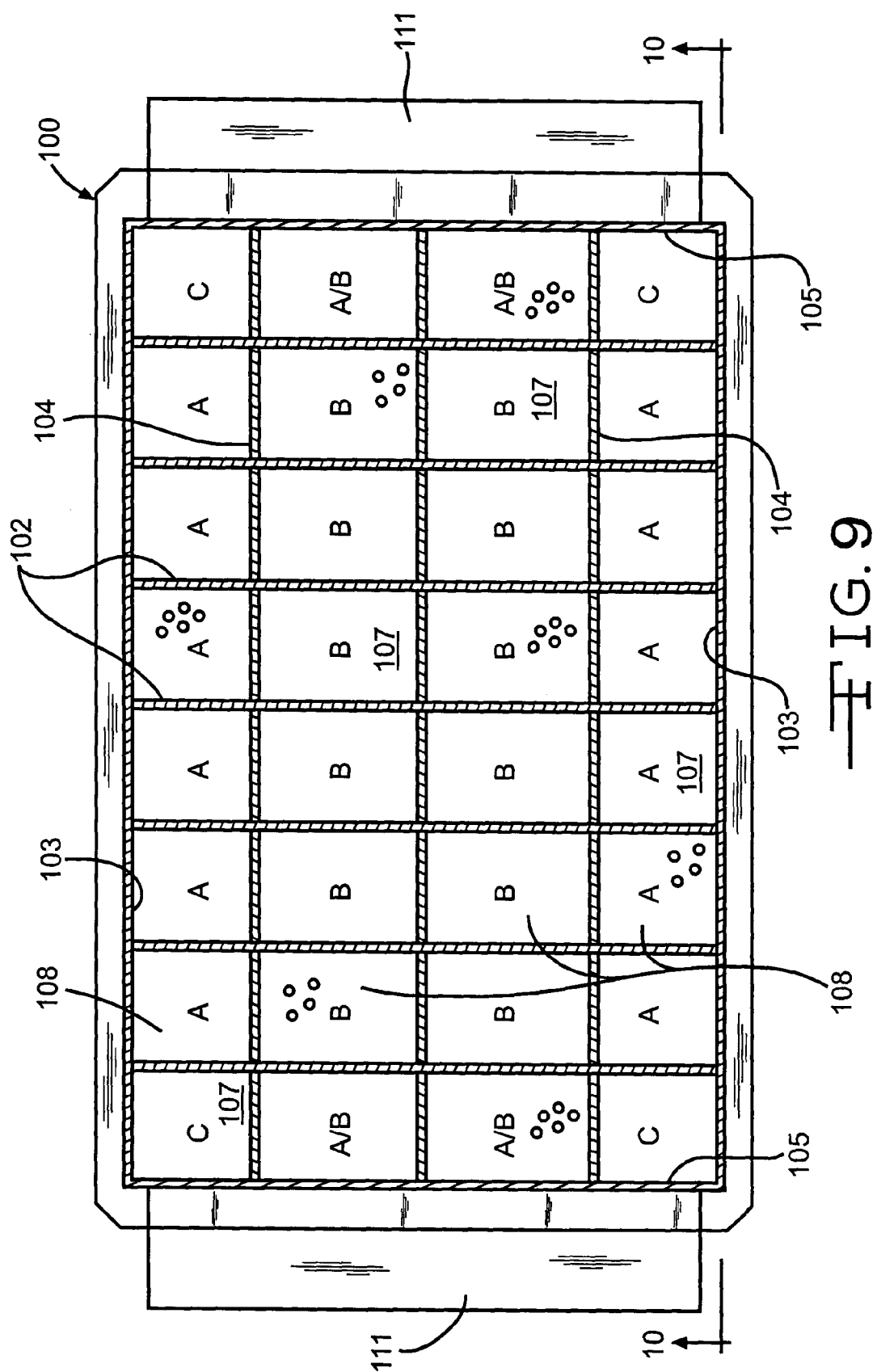
FIG. 9 is a horizontal cross sectional (looking up) view of a bushing with the tip plate removed to show internal reinforcing supports and 32 cells created by the internal supports and walls of the bushing, and a screen according to the present invention.
Figure 10:
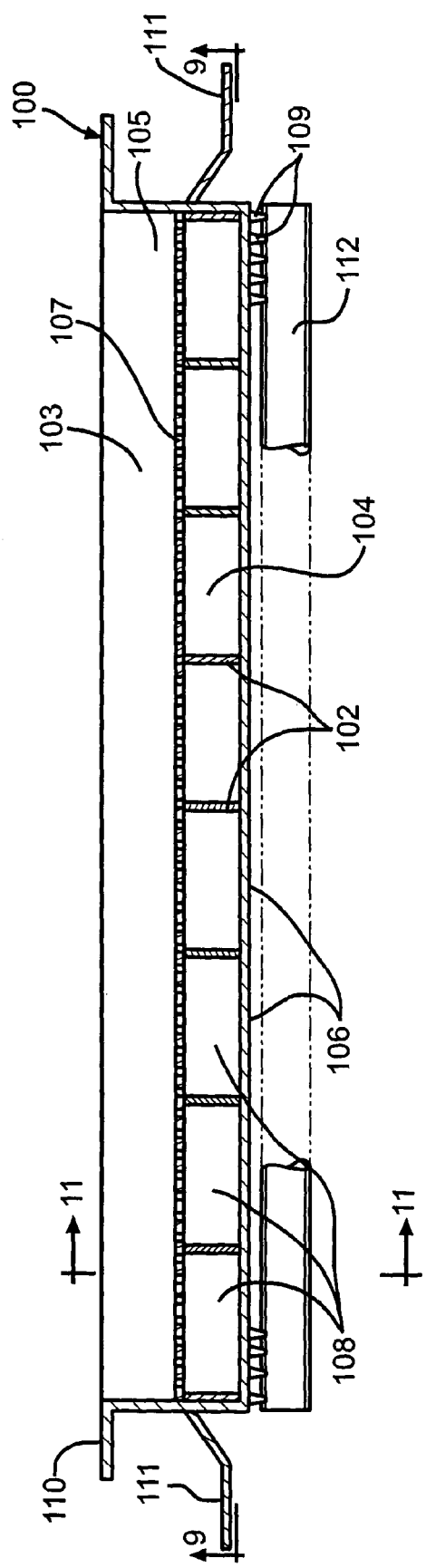
FIG. 10 is a vertical cross sectional view along lines 10-10 of the bushings shown in FIGS. 9 and 9A.
Figure 11:
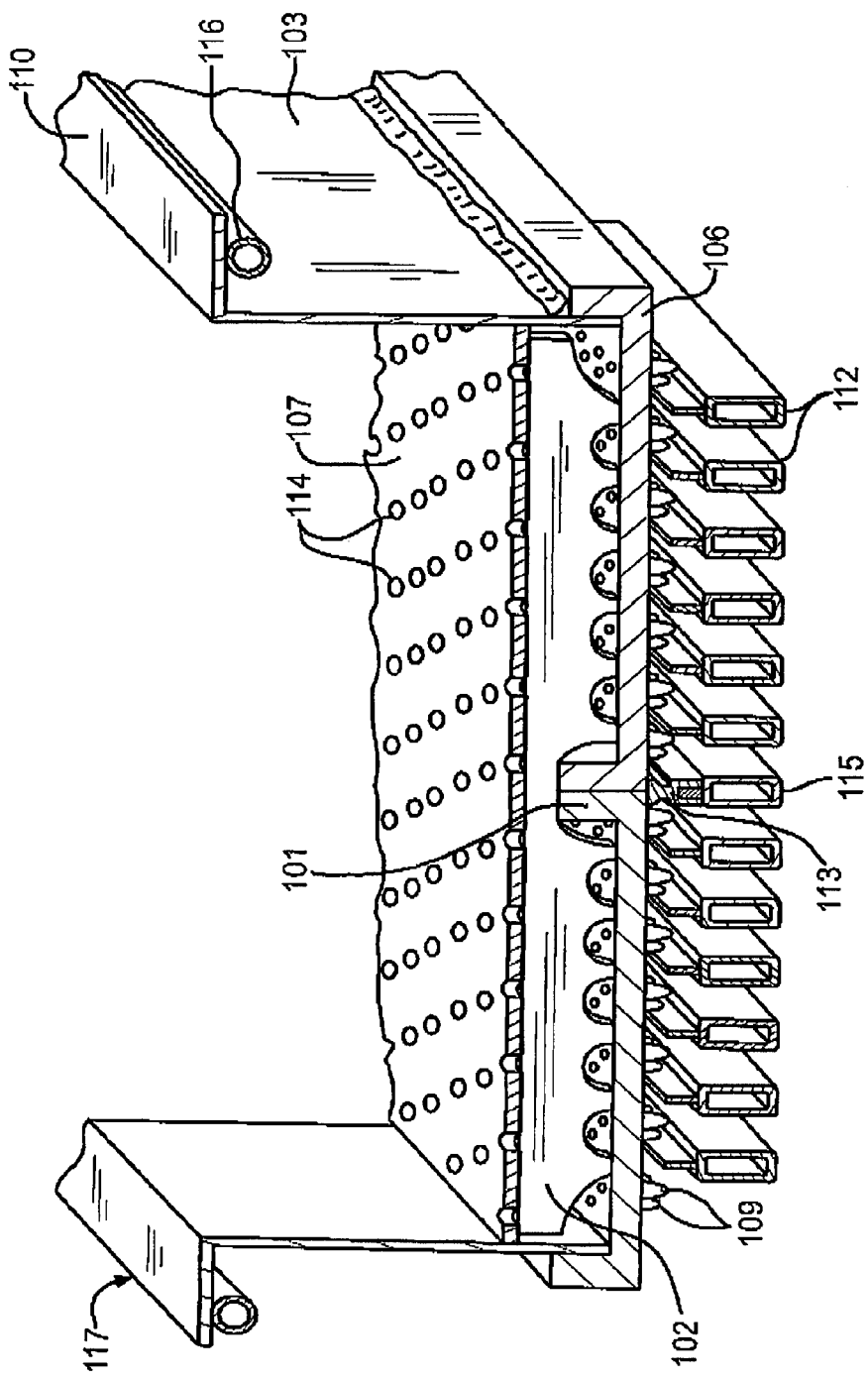
FIG. 11 is a cross section of a portion of the bushing shown in FIGS. 9A and 10 along lines 11-11.

FIGS. 9-18 show some other embodiments of the present invention. FIGS. 9-11 show a bushing 100 having 32 interior cells 108. FIG. 9 is a horizontal cross section of the bushing 100 along lines 9-9 of FIG. 10, i.e. looking up from below the bushing 100 with its tip plate 106 and tips 109 removed, seeing the cells 108 and the underneath surface of a bushing screen 107 having holes therethrough. The bushing 100 has internal reinforcing cross supports 102 and linear supports 104 that are welded to the top surface of the tip plate 106 as described in U.S. Pat. No. 6,453,702, the disclosure incorporated herein by reference. The supports 102 and 104 fit together at their crossing points using slots in one or both of the cross supports 102 and the linear supports 104, as shown and described in U.S. Pat. No. 6,453,702, such that the top surfaces of the supports 102 and 104 are all in a common plane to support the screen 107. The internal structure of the supports 102 and 104 in cooperation with sidewalls 103 and end walls 105 form thirty-two cells 108. The cells can be all the same size, but in the bushing of FIG. 9 the cells 108/A, and 108/C (at each of the four corners of the bushing) adjacent the sidewalls 103 are smaller in screen area than the two center rows of cells 108/B. The cell area means the area of the screen and the area of the tip plate defined by the interior surfaces of the supports 102 and 104, a sidewall 103, where present in the cell, and an end wall 105, where present in the cell.

The areas of the screen 107 above the cells 108/A, 108B and 108/C, screen areas, have different hole sizes and/or hole densities to produce a flow of molten material therethrough that will produce a uniform tip plate temperature profile. Those screen areas adjacent the end walls 105 labeled 108/A/B can have either the hole size and/or hole density of the 108/A or the 108/B screen areas depending upon whether the ends of the bushing tend to run too hot or too cold. If the ends of the bushing tend to run cold using 108/B in these areas, then these areas should be the same as 108/A, or similar. The supports 102 and 104 cause most if not all of the molten material to flow to and through those tips 109 under the cell area. The bottom portion of the supports 102 and 104 have cutouts therein, like the supports 38 in FIG. 5, to avoid impeding the flow of molten material into the tips 109 located below the supports 102 and 104. Some molten material could flow through these cutouts into adjacent cells, but that flow will at most be a minor percentage of the total flow within each cell. The bushing 100 also has a conventional flange 110 integral with or attached to the tops of the sidewalls 103 and the end walls 105, a flange cooling tube 116 (copper), a conventional terminal ear 111 attached to each end wall 105 in a conventional manner and cooling tubes 112 mounted below the tip plate 106 in a conventional manner. A double finned cooling tube 115 is used as a center cooling tube. The double fin is to provide additional cooling and also to make the cooling tube more rigid since it also supports the tip plate 106 down the center of its length. A ceramic insulator 113 rests on the cooling tube 115 between the two fins and also fits snugly against the bottom of the tip plate 106 as shown.

In the bushing shown in FIG. 9 the screen areas 108/A, 108/B and 108/C each have a different hole area per unit screen area. Per unit screen area refers only the to the screen area within that cell. Often screen areas 108/C have the highest hole area per unit screen area to heat up the otherwise cooler corners and tip plate portions at the four corners of the bushing. By cooler is meant a lower temperature than the desired tip plate temperature and by hotter is meant having a temperature higher than the desired tip plate temperature. The screen areas 108/A have a lower hole area per unit screen area than that of screen areas 108/C, but higher than that of screen areas 108/B to heat up the otherwise cooler side edge portions of the tip plate 106. The hole area of screen areas 108/A/B can be the same as that of 108/A or 108/B or something in between those two values. The center portion of a bushing normally runs hot because the glass coming into the center portion of the bushing is hotter and because the center portion of the tip plate and tips thereon are harder to cool because these tips are shielded by several rows of peripheral tips and are furthest from the faster cooling corners and edges of the bushing. Therefore, the hole area per unit screen area of screen areas 108/B is the lowest to restrict the flow of the hotter, lower viscosity, glass. The actual magnitudes of the hole area per unit screen area of the various screen areas 108/A, 108/B, 108/A/B and 108/C will depend upon the size and individual design of the bushing, the type of cooling means used to cool the tips, molten material and fibers, the air flow around the bushing and the temperature profile of the molten material, temperature variation, coming into the bushing. Given this disclosure, it is within the ordinary skill of the art to engineer a bushing screen according to the present invention to achieve an improved tip plate temperature profile, i.e. more uniform temperature profile.

Figure 9A:
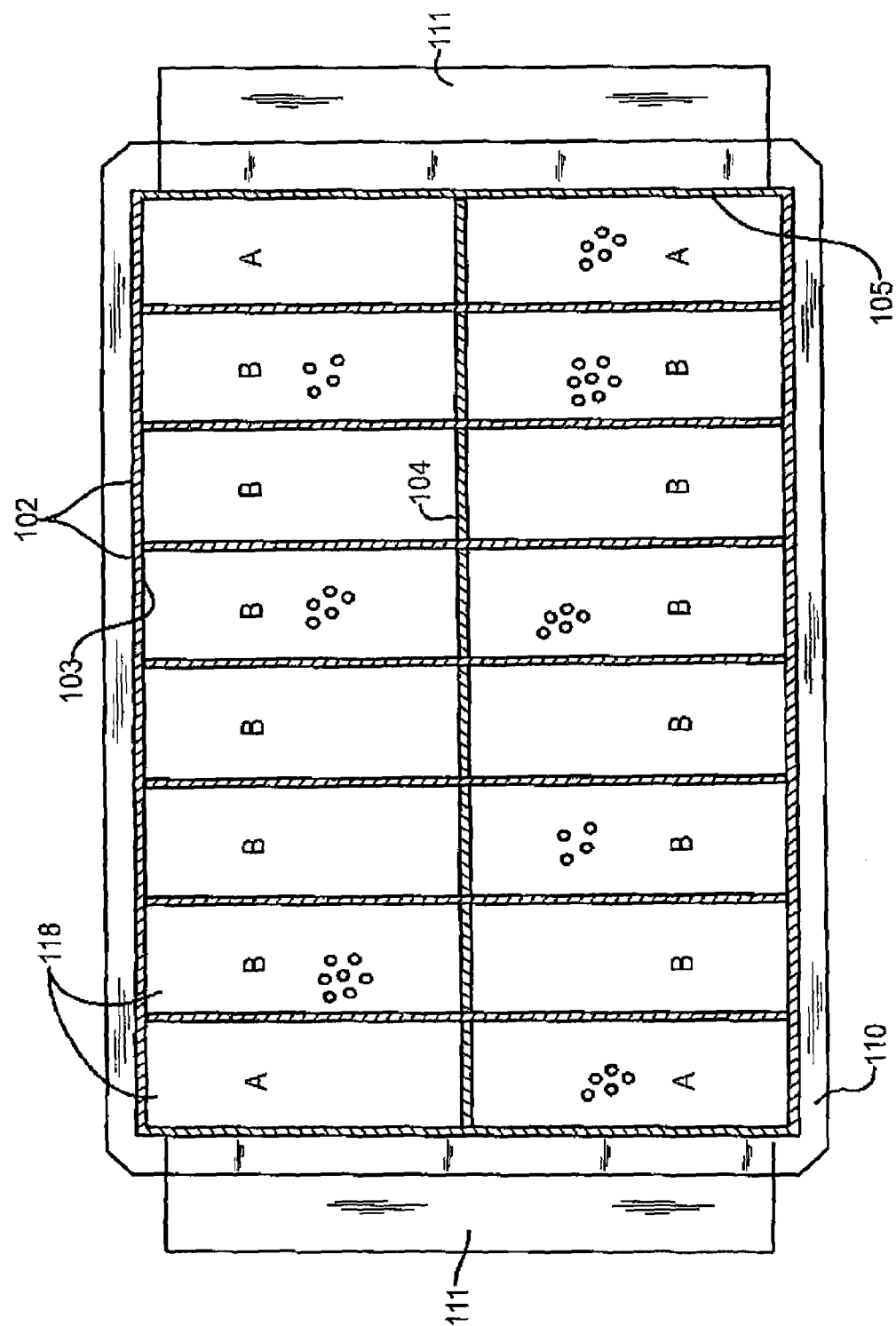
FIG. 9A is a horizontal cross sectional (looking up) view of a bushing with the tip plate removed to show internal reinforcing supports and 16 cells created by the internal supports and walls of the bushing, and a screen according to the present invention.

FIG. 9A shows a bushing 117 made according to the present invention, but having only 16 cells 118. This application would be used for a bushing that otherwise tended to have cooler tip plate end portions in operation making fibers. In this embodiment the screen areas over cells 118/A adjacent the end walls 105 have a higher hole area per unit screen area than screen areas over cells 118/B. The bushing 117, shown in FIG. 11 has a center reinforcing linear support 101 made by forming the tip plate 106 using two linear sections, turning up adjacent linear edges of each section and butt welding the two turned up edges together to form support 101 It is also suitable to use a one piece tip plate and a linear support 101 having the same cross section as the cross supports 102 shown in FIGS. 9 and 10.

The bushings 100 and 117 perform in a substantially superior manner to prior art bushings, particularly in bushings having 1600 or more orifices, with or without the same number of tips 109. Some bushings don't have tips, but at most raised areas around each orifice on the bottom side of the orifice plateut at most raised areas around each orifice on the bottom side of the orifice plate.

Figure 12:
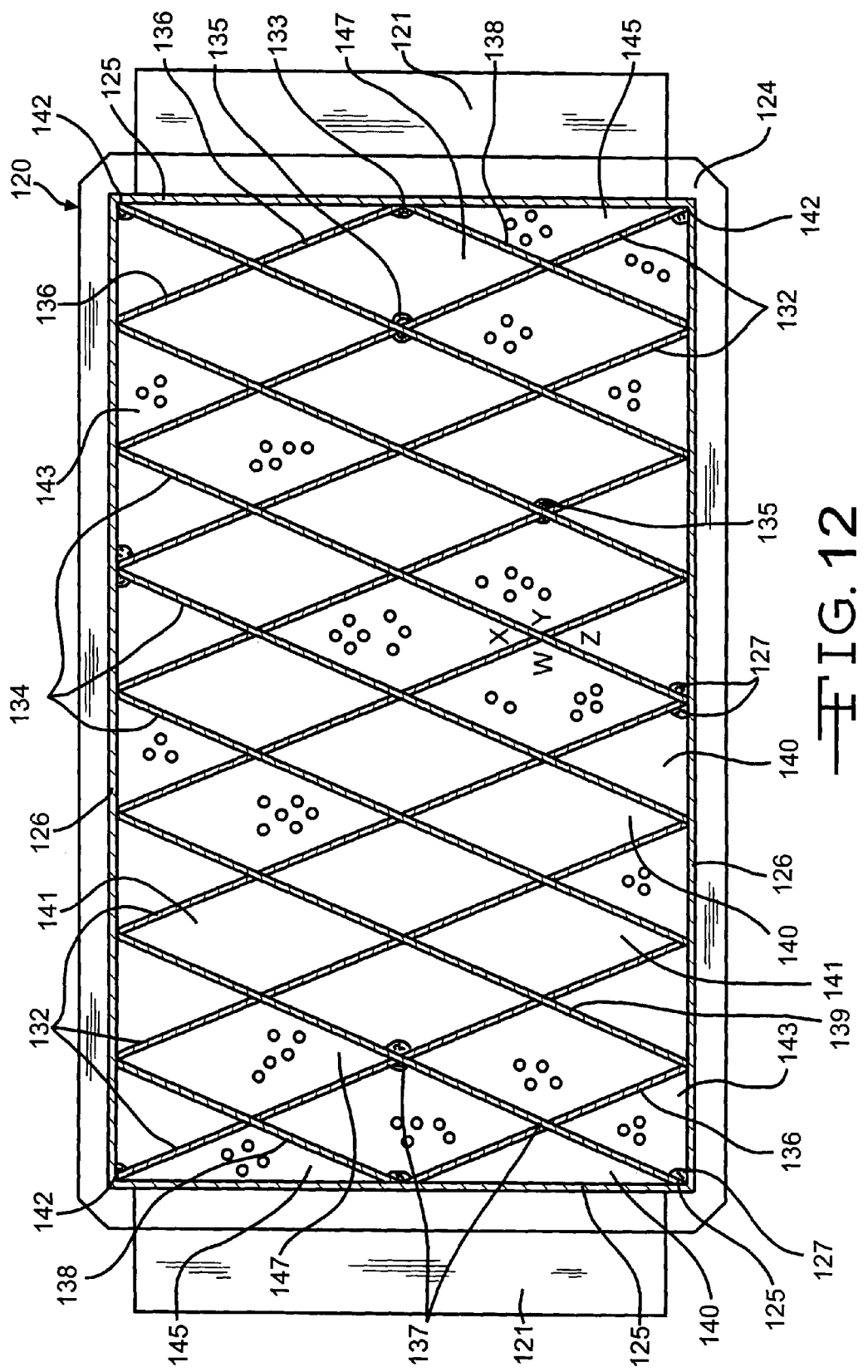
FIG. 12 is a horizontal cross sectional (looking up) view of a bushing with the tip plate removed to show internal reinforcing supports and 42 cells created by the internal supports and walls of the bushing, and a screen according to the present invention.
Figure 14:
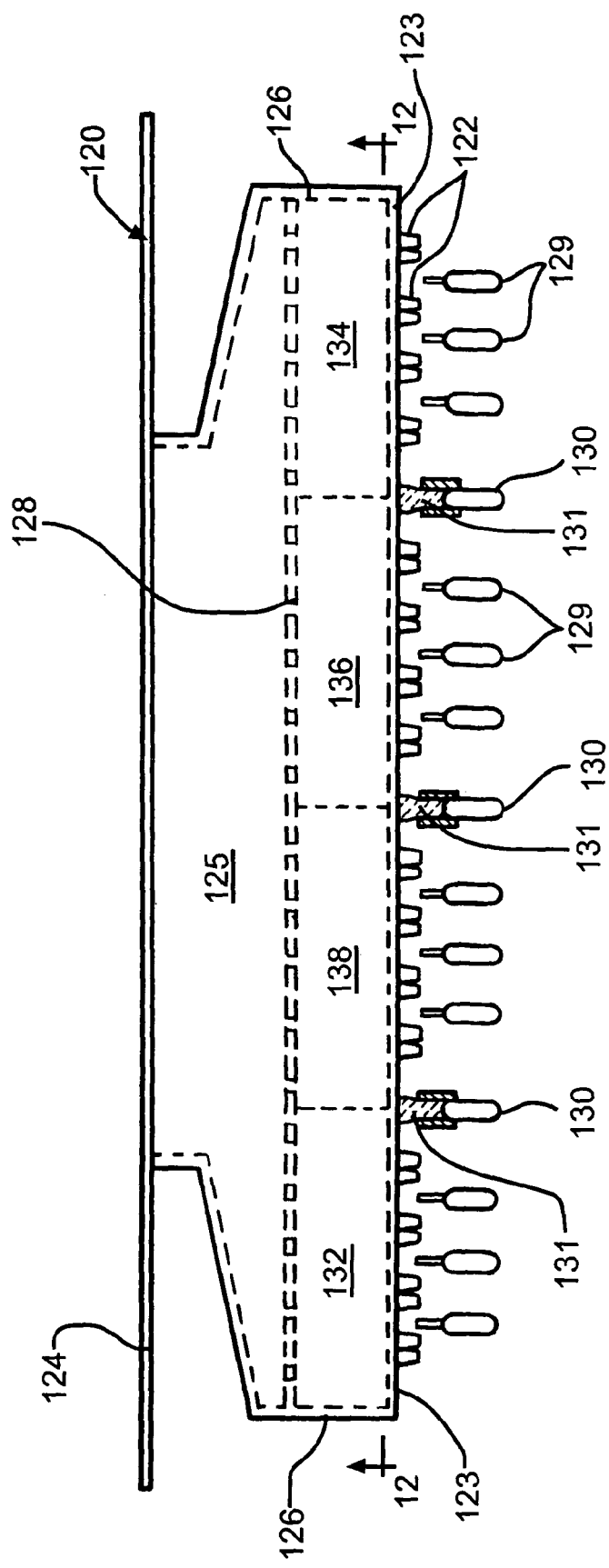
FIG. 14 is an end view of a portion of the bushing shown in FIGS. 12 and 13.

FIGS. 12 and 14 show a bushing 120 having about 4030 tips 122, a mounting flange 124 extending entirely around the top of the bushing and integral with or welded to the tops of the end walls 125 and sidewalls 126. FIG. 14 is an end view of the bushings shown in FIG. 12 with a terminal 121 left off to better show the internal reinforcing structure. The bushing 120 has an electrical-terminal ear 121 welded to each the exterior surface of each of the end walls 125. An orifice or tip plate 123, containing double rows of tips 122, is welded to the lower ends of the sidewalls 126 and end walls 125. Single finned cooling tubes 129 and double finned cooling tubes 130 with ceramic supports 131, as previously described, are used to cool the tips 122 and to support the underside of the tip plate 123 in operation of the bushing 120 in the same manner as described previously and in U.S. Pat. No. 6,453,702. The ceramic supports 131 can be any refractory material that does not react with a platinum-rhodium alloy at temperatures in the range of 1900-2300 degrees F. and that has good hot load resistance at these temperatures, such as aluminum oxide, mullite, other known high alumina refractory and other known refractories for use in these conditions.

The tips 122 are arranged in double rows and are just like prior art tips. The inside diameter of the bore in the tip will depend on the type of glass being fiberized, the desired diameter of the fiber product and the capability of the fiber processing equipment being used as is well known in the art. While the bushing described here is a cooling tube type bushing, the invention is equally useful on all types of fiberizing bushings having an orifice or tip plate that tends to sag and creep in operation, that has a less than desirable tip plate temperature profile such as those that use other means of cooling such as well known blade like fins, solid or hollow, well known forced air cooling, or only ambient air cooling. The particular method of cooling the tips, orifice plate and molten glass emerging from the tips or orifices in the orifice plate is not critical to the present invention.

Referring to FIGS. 12 and 14, a diamond shaped reinforcing support structure 139 comprised of intersecting reinforcing supports 132, 134, 136, and 138, welded to the side walls 126 with welds 127, some to the end walls 125 with welds, the top surface of the tip plate 123 and to each other at their intersections 137 with welds 135 to provide superior support to the tip plate 123 and the screen 128 resting on the tops of the reinforcing supports. For more details on the shape of the supports and how they fit together see U.S. Pat. No. 6,453, 702. The structure 139 shown in FIG. 12 contains seven outer diamond shaped cells 141 down its length and fourteen total, eight triangular cells 143 down its length and 16 total, two broad triangular cells 145 at each end of the bushing and four total, and eight center diamond shaped cells 147 down the length and in the center portion of the structure 139, but the bushing 120 could be lengthened to have more tips 122. If the bushing is lengthened, the number of cells 141, 143 and 147 will increase. The reinforcing support structure 139 substantially reduces the rate of sag of the orifice or tip plate 123 and the screen 128 when the bushing 120 is in operation at high temperatures making inorganic fiber, and also forms a plurality of cells 140 on the interior of the bushing 120 between the screen 128 and the tip plate 123.

Each of the internal reinforcing supports 132, 134, 136 and 138 are preferably made from platinum-rhodium alloy having cutouts in their lower portion and spaced apart to coincide with the rows of tips 122. The supports 132, 134, 136, and 138 are welded to the top surface of the tip plate 123 along the bottom edges of the supports. In this preferred embodiment, the internal supports that are parallel to each other are spaced apart about two inches apart, although spacings of up to about four inches would still be effective. Spacings smaller than two inches will be cost effective when the prices of the precious metals used for the internal supports are in the lower quartile or so of their price ranges.

The type of alloy, length, height and thickness of the supports 132, 134, 136 and 138 can vary considerably depending on the size of the bushing and sometimes on the prices of rhodium and platinum, but in the preferred embodiment the bars are a nominal 80 platinum-20 rhodium alloy and the thickness of the bars is about 0.04 inch, the height about 0.5 inch and the length about 9.97 inches. Zirconia or Thoria or other refractory dispersion strengthened platinum-rhodium alloy or platinum can also be used as the alloy in making the supports.

At every location where support bars 132, 134, 136 and 138 intersect, cross, one another one of four angles, angle W, X, Y, or Z, is formed. Two of the angles, in this embodiment angles W and Y, are significantly greater than 90 degrees and two of the angles, in this embodiment angles X and Z, are significantly less than 90 degrees, preferably between about 40-80 degrees, most preferably about 50-70 degrees such as about 60+/−5 degrees. Angles W and Y would be the same and would be 180 degrees minus angle X or angle Z. Preferably the angles greater than 90 degrees, angles W and Y, face an end wall of the bushing and the angles less than 90 degrees face a sidewall of the bushing.

It is preferred that a support enter each of the inside four corners 142 of the bushing, a corner being defined as the angle formed by a side wall 126 contacting an end wall 125 adjacent and near the orifice or tip plate 123. This arrangement provides optimum distribution of electrical power down the length of the bushing for uniform heating of the bushing by electrical resistance. If the supports 136 and 138 contact the end walls 125 without entering each of the inside four corners 142 of the bushing, these supports tend to drain power away from the corners of the bushing making the corners colder and causing fiberizing problems.

The supports 132 and 134 that enter the inside corners 142 of the bushing are welded in place at the side walls 126 with fillet welds 127 as shown in FIG. 12. All of the supports 132, 134, 136 and 138 are also welded on both sides to the orifice or tip plate 123 along both sides of each of the bottom edges of the supports, in the wide angles W and Y of each intersection as shown by the fillet welds 135 and to the side walls 126 with fillet welds 127. Supports 136 and 138 are also welded to each end wall 125 with a fillet weld 133. The fillet weld 127 and 133 begin at the top of the supports and extend down as far as practical, but need not extend all the way to the bottom edge of the supports. The screen 128 (FIG. 14) sets on top surfaces of the supports 132, 134, 136 and 138 but need not be welded to the supports. The screen 128 can be welded continuously at its top edges to the end walls 125 and the sidewalls 126. When bushings of the present invention are removed after months of operation, it is noted that the screen is also welded to the tops of the supports, apparently by diffusion welding in operation at operating temperature.

Figure 13:
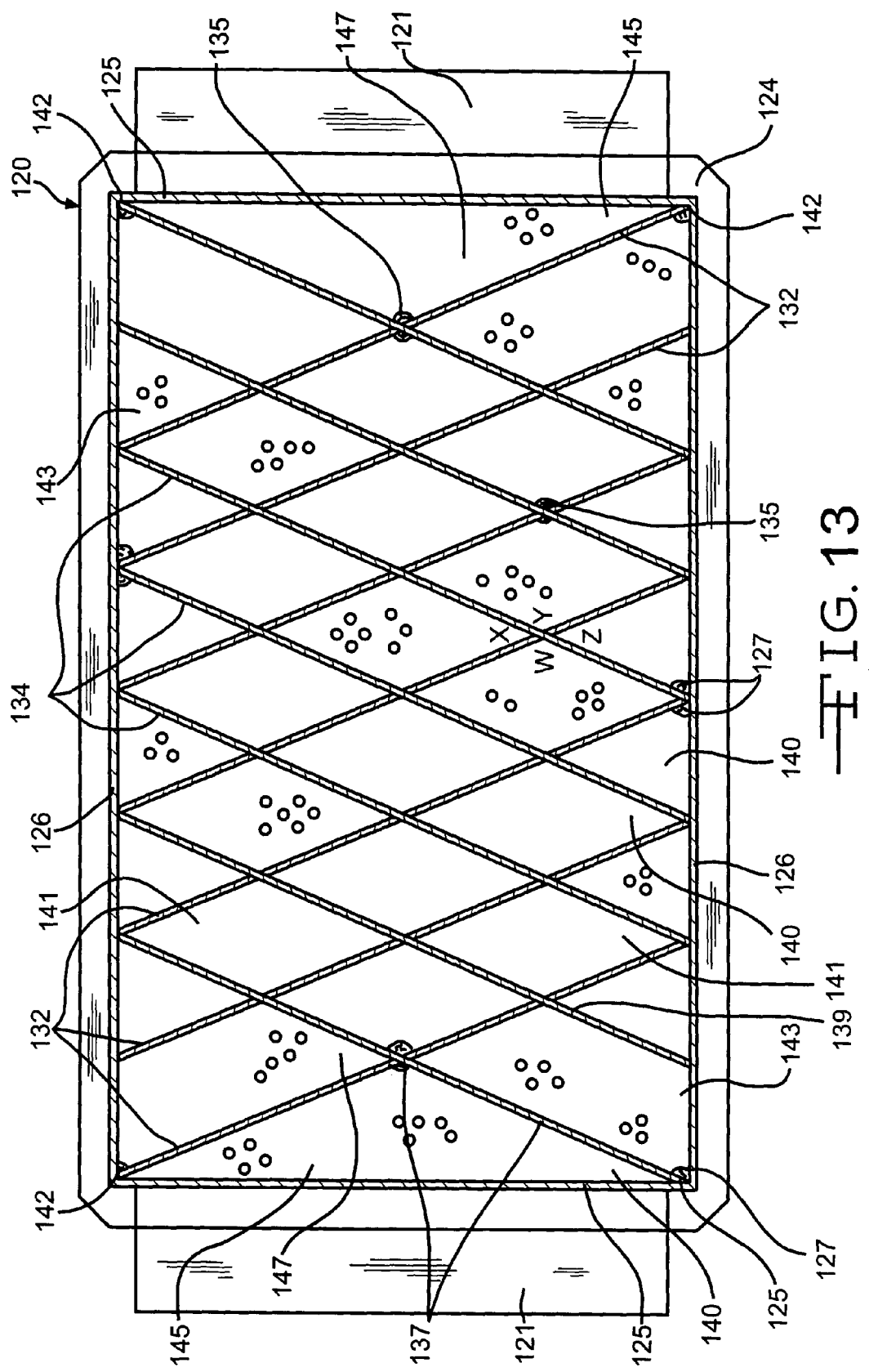
FIG. 13 is a horizontal cross sectional (looking up) view of a bushing with the tip plate removed to show internal reinforcing supports and 35 cells created by the internal supports and walls of the bushing, and a screen according to the present invention.

The supports 136 and 138 are optional and need not be used as illustrated in an optional embodiment shown in FIG. 13. This embodiment is the same as the preferred embodiment described above except that the short supports 136 and 138 were not used. The supports 132 and 134 are welded in the same relative locations as in the preferred embodiment.

The diamond shaped reinforcing structure 139 could also be made with a combination of long bars and short bars (not shown) each having no slots, the long bars and the short bars being welded together at their intersections with each other in the same or similar manner as described herein. Some of the supports in the resulting diamond shaped structure would be continuous and the others would be discontinuous but for the welds to the intersecting supports.

The fiberizing bushings of the present invention are used to make fibers from molten materials, including molten glasses, in place of the fiberizing bushings in any known fiberizing process using fiberizing bushings such as disclosed in U.S. Pat. Nos. 5,935,289, 4,551,160, 4,411,180, 4,194,896, 3,869, 268, the disclosures of which are incorporated herein by reference, and other similar fiberizing processes.

It will be obvious to bushing artisans that the square, rectangular and diamond shaped support structure can be modified in several ways such as by using more or fewer support bars having different angles of intersection, by using curved or bowed support bars instead of straight support bars, by the use of a honeycomb like shape support and by many other changes. All of these modifications are within the concept and scope of the present invention so long as elements of the support structure engage each inside corner of the bushing adjacent and near the orifice or tip plate of the bushing as reflected in the claims below.

To engineer a bushing screen having a plurality of screen areas covering a plurality of cells in the bushing the following procedure is used. A conventional screen having the same hole area above each cell is installed in a desired test bushing, the bushing is operated to make fibers and the tip plate temperature profile is determined using any suitable means. Conventional temperature measuring equipment can be used to do this and also the fiber diameters of many representative fibers from tips across the length and width of the bushing can be measured. Fibers coming from "cold" tips, tips having a temperature below the desired temperature, will have a fiber diameter smaller than desired and fibers coming from "hot" tips will have a diameter greater than desired. A thermographic map, with the cell areas superimposed on the map, can then be made of the tip plate using this data. From that map it will be apparent which screen areas need more molten material flow and which need less molten material flow than in the test bushing. An engineered screen is then designed using this information, increasing the hole area per unit area of screen area in the screen areas needing more molten material flow, decreasing the hole area per unit area of screen area in the screen areas needing less molten material flow and keeping the hole area per unit screen area in the screen areas having the proper flow to produce the desired fiber diameter. The same thermographing procedure can be repeated on the tip plate of the bushing containing the engineered screen to further optimize the tip plate temperature profile, fiber product quality and fiberizing efficiency. This procedure is illustrated in the following examples.

EXAMPLE 1

Figure 15:
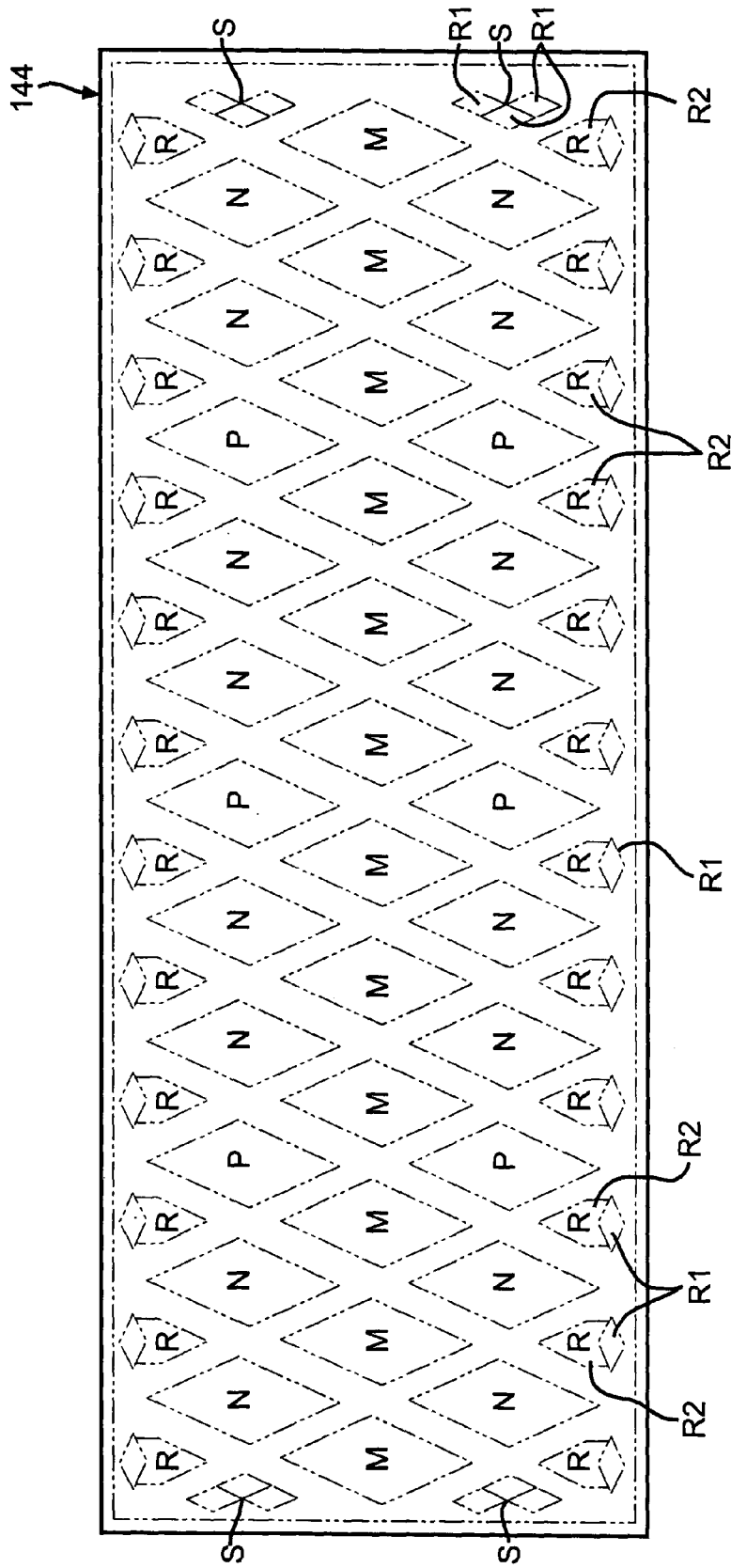
FIG. 15 is a plan view of a partially optimized bushing screen according to the present invention and showing a pattern of hole areas for use in the bushing shown in FIG. 12.
Figure 16:
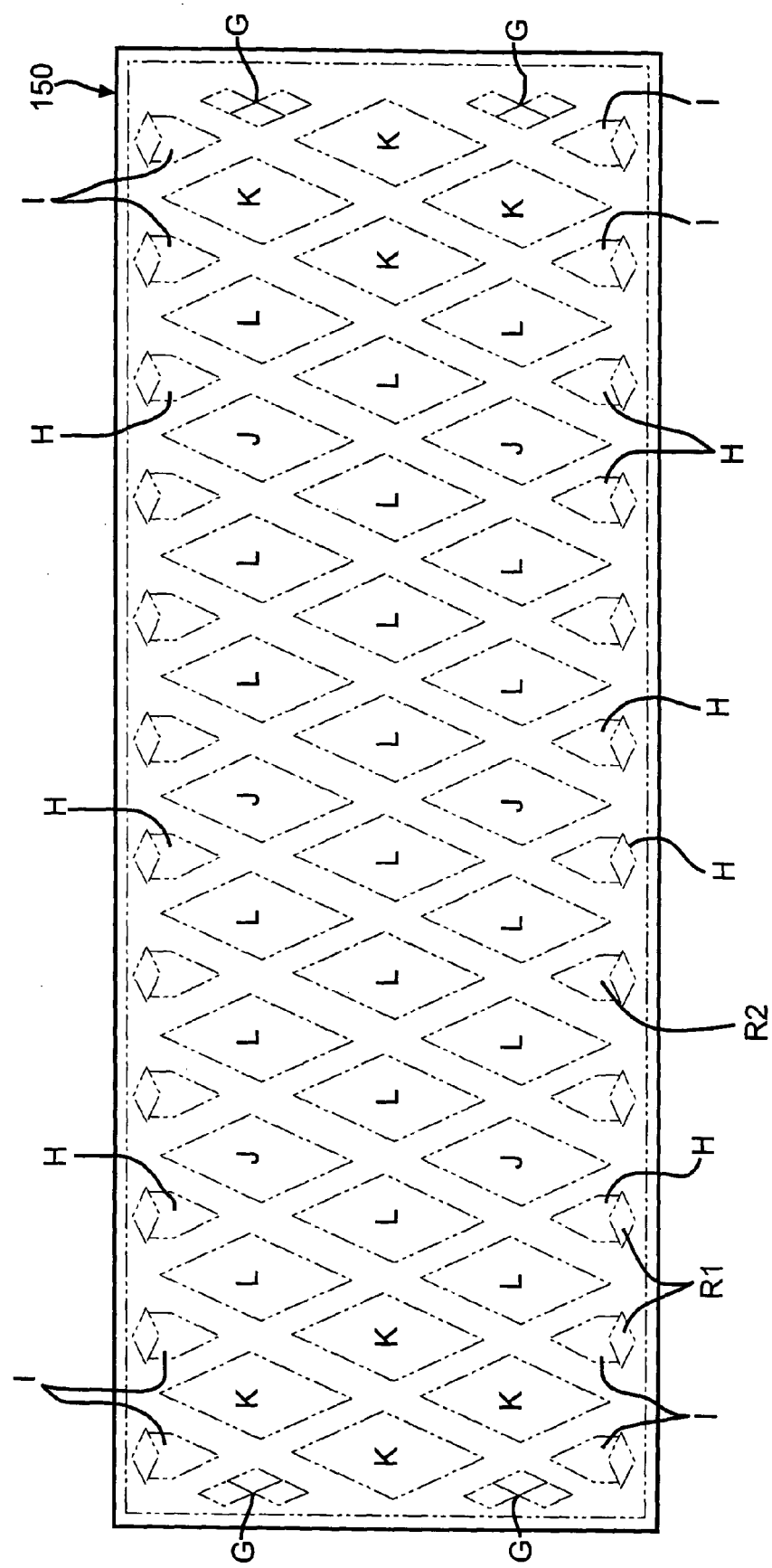
FIG. 16 is a plan view of a more optimized bushing screen according to the present invention and showing a pattern of hole areas for use in the bushing shown in FIG. 12.

Using information from test bushings having a conventional screen, a preferred engineered hole pattern for a screen 144 for use with a bushing just like bushing 120 shown in FIGS. 12 and 14, but longer to have about 4800 tips 122, having eleven outer diamond shaped cells 141 instead of seven, was designed and is shown in FIG. 15. The reinforcing support structure 139 used in this longer bushing has twelve center diamond shaped cells 147 instead of the eight in the structure 139 shown in FIG. 12, and twelve triangular cells 143 instead of the eight shown in FIG. 12. The number of broad triangular cells 145 at the ends of the bushing remains the same at four. The length of the screen 144 in this bushing is 25.34 inches long and 9.31 inches wide.

All of the screen areas above the cells 140 do not have the same hole pattern. There are four different shapes or sizes of cells, 141, 143, 145 and 147 and as shown in FIG. 15 and there are four different types of screen areas, i.e. shape of screen area and/or hole size and/or hole density per square inch of screen area, above the cells 140. There are two different types of screen areas above the large diamond shaped cells 141. There is one type of screen area M above the twelve center diamond shaped cells 147 that extend down the length at the center of the screen 144. The screen area M is 3.22 inches long by 1.5 inches wide, distance from center of outer hole center of opposite outer hole and contains 90 round holes, each hole having a diameter of 0.055 inch. The spacing is not critical, but should was generally evenly spaced (this is not appropriate if a particular smaller area of the tip plate below the cell needs a different flow than the remainder of the cell). The same hole pattern is used for sixteen screen areas N covering sixteen of the outer diamond shaped cells 141 in the pattern shown in FIG. 15.

A different hole pattern is used in the screen areas P covering the remaining six outer diamond shaped cells 141. The screen area P is the same size as the screen area M and also the screen area N, but the hold density per unit screen area of screen area P is different. The tip plate areas below the screen areas P have fewer tips than the tip plate areas below screen areas M and N because supports for the cooling tubes 130 run transverse of the bushing length below the cooling tubes 130 beneath the screen areas P. The screen areas P each contain only about 49 holes, each hole having a diameter of about of 0.055 inch and are spaced further apart than the holes in screen areas M and N.

Twenty four screen areas R cover the triangular cells 143 and are all alike. Each screen area R contains 50 holes, each hole having a diameter of about 0.055 inch. Each screen area R preferably comprises a very small diamond shaped section R1 adjacent to the sidewall edges of the screen 144 with its length running in the length direction of the screen, and a larger half diamond shaped section R2 which comprise three very small diamond shaped sections the same size as R1 adjacent each other, but with the center section offset from the other two, all having their length running in the width direction of the screen. The very small diamond section R1 measures about 0.35 inch in the screen width direction and about 0.81 inch long in the screen length direction, these measurements being from the end hole center to the opposite end hole center, and contains 16 holes. The half diamond section R2 measures about 1.37 inch in the screen width direction and about 0.81 inch in the screen length direction as measured from hole center on one extremity to the hole center on the opposite extremity, and contains 34 holes.

Four screen areas S cover the four broad triangular cells 145. Each screen area S contains forty-eight holes, each hole having a diameter of about 0.055 inch. Each screen area S is made up of three very small diamond shaped sections, like section R1, each section adjacent over part of its length with another section (the center section adjacent over a part of its length to the other two sections, wit the sections staggered to fit the shape of the cells 145. Each R1 section in the S screen areas is the same size and contains sixteen holes. Each screen area S measures about 1.9 inch in the screen width direction and about 0.52 inch in the screen length direction, the measurements being from the center of the hole in one extremity to the center of the hole in the opposite extremity. The engineered screen design described above is summarized in the following table.

TABLE I

| Cell | # of Cells | | # of Holes | # of Tips* |
|---|---|---|---|---|
| M | 12 | x | 90 | 110 |
| N | 16 | x | 90 | 110 |
| P | 6 | x | 49 | 45 |
| R | 24 | x | 50 | 55 |
| S | 4 | x | 48 | 32 |
| Total | 62 | | 4206 | 4798 |

*The numbers of tips in the tip plate areas beneath these screen areas.

Several of these bushing having an internal reinforcing structure like that shown in FIG. 12, but stretched to accommodate the screen 144 as shown in FIG. 15 and described above was operated making E glass 13 and 16 micron fibers. The tip plate temperature profile and the fiberizing efficiency were both substantially improved compared to the prior art bushings having a conventional screen with uniform hole patterns.

EXAMPLE 2

Tip plate temperature profiles were taken on operating bushings described in Example 1, recorded and analyzed. Cells needing more molten material flow and cells needing less molten material flow were noted and a new screen 150, FIG. 16, was engineered having the same number and shape of screen areas as shown in FIG. 15, but the hole area per unit screen area was modified by changing the hole density, i.e. number of holes in the same areas, for some of the screen areas as shown in Table II. All of the holes were 0.055 inch diameter. The hole area per unit of screen area could instead have been modified by changing the hole diameter, shape, etc.

TABLE II

| Cell | # of Cells | | # of Holes | # of Tips* |
|---|---|---|---|---|
| G | 4 | x | 41 | 32 |
| H | 16 | x | 50 | 55 |
| I | 8 | x | 59 | 55 |
| J | 6 | x | 49 | 45 |
| K | 8 | x | 81 | 110 |
| L | 20 | x | 90 | 110 |
| Total | 62 | | 4178 | 4798 |

*The numbers of tips in the tip plate areas beneath these screen areas.

Bushings using this screen 150 produced significantly improved tip plate temperature profiles, fiberizing efficiencies and product uniformity the bushing than the screen 144 described in Example 1 and FIG. 15. The method of engineering the bushing screen to optimize the tip plate temperature profile and fiberizing efficiency can be repeated with each different bushing design, size, etc. until optimization has been reached.

In the bushings of the present invention it is not necessary that the screen having an engineered hole pattern and hole areas lay directly on the top of the internal reinforcing support structure, though that is normally the case, particularly after the bushing has been exposed to operating temperature for several hours due to sagging of the screen. It is permissible that the screen be mounted "near" the tops of the internal reinforcing supports or structure, "near" meaning up to that distance at which lateral flow of glass from one cell to one or more adjacent cells becomes significant to maintaining optimization of the tip plate temperature profile. When the engineered screen according to the present invention is a "lay-in screen" it can rest on a conventional screen having a uniform hole pattern and hole area per unit of screen area, at least in the screen areas above the cells.

The invention claimed is:

1. A bushing for receiving molten material from a bushing leg of a glass tank and for fiberizing the molten material comprising at least two opposed sidewalls and at least two opposed end walls, a tip plate having at least 1600 orifices with at least 1600 hollow tips extending from a lower surface of the tip plate and arranged in double rows, the tip plate being attached to the sidewalls and end walls, the bushing having a boxlike shape having at least four interior corners, an interior support structure comprising a plurality of intersecting or crossing internal supports with angles between the intersecting supports at each intersection welded to a top surface of the tip plate for supporting the tip plate, at least some of the internal supports being attached to one or more of the end walls and at least some of the internal supports being attached to one or more of the sidewalls, the bushing also having linear external supports contacting the bottom of the tip plate and a screen in the bushing, the screen having a low flow rate center portion and one or more high flow rate portions, the high flow rate portion(s) being adjacent to the center portion and one or more walls of the bushing, the entire bottom of the screen resting on, or mounted near, the top of the interior support structure, the interior support structure, in cooperation with the at least one sidewall and the at least one end wall, forming at least 24 cells located between the bottom of the screen and the top of the tip plate, the screen having a plurality of screen areas containing holes through the screen with a screen area above each of the cells, the hole area per unit screen area being greater in the high flow rate portions(s) of the screen than the hole area per unit screen area in the low flow rate center portion of the screen, to achieve more uniform tip plate temperature profile, the screen being located so close to the top of the interior support structure that the distance from the bottom of the screen to the top of the interior support structure is less than that at which lateral flow of molten glass from one cell to one or more adjacent cells becomes significant to maintaining optimization of tip plate temperature profile.

2. The bushing of claim 1 wherein the interior support structure is made of a precious metal or a precious metal alloy, the screen is a first screen and a second screen having holes therethrough is laying on top of the first screen, at least some of the holes in the second screen aligning with holes in the first screen and the area of the holes per unit area of the second screen is less than the area of holes per unit area of the first screen.

3. The bushing of claim 1 wherein the interior support structure contains diamond shaped cells and is also attached to the sidewalls and wherein the bushing has at least 1600 hollow tips.

4. The bushing of claim 3 wherein some supports of the interior support structure enter the interior corners of the bushing.

5. The bushing of claim 4 wherein a screen area closest to each corner of the bushing has a hole area per unit screen area that is substantially greater than that of the screen area that is closest to a lengthwise centerline of the screen.

6. The bushing of claim 4 wherein screen areas nearest an end wall of the bushing have a substantially higher hole area per unit screen area, in the range of about 10 to about 16 percent, than screen areas in the center portion of the screen, in the range of about 2.5 to about 6 percent.

7. The bushing of claim 3 wherein the bushing contains at least 32 cells between the screen and the tip plate.

8. The bushing of claim 7 wherein a screen area closest to each corner of the bushing has a hole area per unit screen area that is substantially greater than that of the screen area that is closest to a lengthwise centerline of the screen.

9. The bushing of claim 7 wherein screen areas nearest an end wall of the bushing have a substantially higher hole area per unit screen area, in the range of about 10 to about 16 percent, than screen areas in the center portion of the screen, in the range of about 2.5 to about 6 percent.

10. The bushing of claim 3 wherein a screen area closest to each corner of the bushing has a hole area per unit screen area that is substantially greater than that of the screen area that is closest to a lengthwise centerline of the screen.

11. The bushing of claim 3 wherein screen areas nearest an end wall of the bushing have a substantially higher hole area per unit screen area, in the range of about 10 to about 16 percent, than screen areas in the center portion of the screen, in the range of about 2.5 to about 6 percent.

12. The bushing of claim 1 wherein some supports of the interior support structure enter the interior corners of the bushing.

13. The bushing of claim 12 wherein a screen area closest to each corner of the bushing has a hole area per unit screen area that is substantially greater than that of the screen area that is closest to a lengthwise centerline of the screen.

14. The bushing of claim 12 wherein a screen areas nearest an end wall of the bushing have a substantially higher hole area per unit screen area, in the range of about 10 to about 16 percent, than screen areas in the center portion of the screen, in the range of about 2.5 to about 6 percent.

15. The bushing of claim 1 wherein the bushing contains at least 32 cells between the screen and tip plate.

16. The bushing of claim 15 wherein a screen area closest to each corner of the bushing has a hole area per unit screen area that is substantially greater than that of the screen area that is closest to a lengthwise centerline of the screen.

17. The bushing of claim 15 wherein screen areas nearest an end wall of the bushing have a substantially higher hole area per unit screen area, in the range of about 10 to about 16 percent, than screen areas in the center portion of the screen, in the range of about 2.5 to about 6 percent.

18. The bushing of claim 1 wherein a screen area closest to each corner of the bushing has a hole area per unit screen area that is substantially greater than that of the screen areas that are closest to a lengthwise centerline of the screen.

19. The bushing of claim 1 wherein a screen areas nearest an end wall of the bushing have a substantially higher hole area per unit screen area, in the range of about 10 to about 16 percent, than screen areas in the center portion of the screen, in the range of about 2.5 to about 6 percent.

20. A bushing for receiving molten material from a bushing leg of a glass tank and for fiberizing the molten material comprising at least two opposed sidewalls and at least two opposed end walls, a tip plate having at least 1600 orifices with at least 1600 hollow tips extending from a lower surface of the tip plate and arranged in double rows, the tip plate being attached to the sidewalls and end walls, the bushing having a boxlike shape having at least four interior corners, an interior support structure comprising a plurality of intersecting of crossing internal supports with angles between the intersecting supports at each intersection welded to a top surface of the tip plate for supporting the tip plate, at least some of the internal supports being attached to one or more of the end walls and at least some of the internal supports being attached to one or more of the sidewalls, the bushing also having linear external supports contacting the bottom of the tip plate and a screen in the bushing, the screen having a low flow rate center portion and one or more high flow rate portions, the high flow rate portion(s) being adjacent to the center portion and one or more walls of the bushing, with the entire bottom of the screen resting on, or mounted near, the top of the interior support structure, the interior support structure, in cooperation with the at least one sidewall and the at least one end wall, forming at least 32 cells located between the bottom of the screen and the top of the tip plate, the screen having a plurality of screen areas containing holes through the screen with a screen area above each of the cells, the hole area per unit screen area being greater in the high flow rate portion(s) of the screen than the hole area per unit screen area in the low flow rate center portion of the screen, to achieve more uniform tip plate temperature profile, the screen being located so close to the top of the interior support structure that the distance from the bottom of the screen to the top of the interior support structure is less than that at which lateral flow of molten glass from one cell to one or more adjacent cells becomes significant to maintaining optimization of tip plate temperature profile.

21. The bushing of claim 20 wherein the interior support structure is made of a precious metal or a precious metal alloy, the screen is a first screen and a second screen having holes therethrough is laying on top of the first screen, at least some of the holes in the second screen aligning with holes in the first screen and the area of the holes per unit area of the second screen is less than the area of holes per unit area of the first screen.

22. The bushing of claim 20 wherein the interior support structure contains diamond shaped cells and is also attached to the sidewalls and wherein the bushing has at least 1600 hollow tips.

23. The bushing of claim 22 wherein supports that are part of the interior support structure enter the interior corners of the bushing.

24. The bushing of claim 23 wherein a screen area closest to each corner of the bushing has a hole area per unit screen area that is substantially greater than that of the screen area that is closest to a lengthwise centerline of the screen.

25. The bushing of claim 23 wherein screen areas nearest an end wall of the bushing have a substantially higher hole area per unit screen area, in the range of about 10 to about 16 percent, than screen areas in the center portion of the screen, in the range of about 2.5 to about 6 percent.

26. The bushing of claim 22 wherein the bushing contains at least 34 cells between the screen and the tip plate.

27. The bushing of claim 26 wherein a screen area closest to each corner of the bushing has a hole area per unit screen area that is substantially greater than that of the screen area that is closest to a lengthwise centerline of the screen.

28. The bushing of claim 26 wherein screen areas nearest an end wall of the bushing have a substantially higher hole area per unit screen area, in the range of about 10 to about 16 percent, than screen areas in the center portion of the screen, in the range of about 2.5 to about 6 percent.

29. The bushing of claim 22 wherein a screen area closest to each corner of the bushing has a hole area per unit screen area that is substantially greater than that of the screen area that is closest to a lengthwise centerline of the screen.

30. The bushing of claim 22 wherein screen areas nearest an end wall of the bushing have a substantially higher hole area per unit screen area, in the range of about 10 to about 16 percent, than screen areas in the center portion of the screen, in the range of about 2.5 to about 6 percent.

31. The bushing of claim 20 wherein supports that are part of the interior support structure enter the interior corners of the bushing.

32. The bushing of claim 31 wherein a screen area closest to each corner of the bushing has a hole area per unit screen area that is substantially greater than that of the screen area that is closest to a lengthwise centerline of the screen.

33. The bushing of claim 31 wherein wherein screen areas nearest an end wall of the bushing have a substantially higher hole area per unit screen area, in the range of about 10 to about 16 percent, than screen areas in the center portion of the screen, in the range of about 2.5 to about 6 .

34. The bushing of claim 20 wherein the bushing contains at least 34 cells between the screen and the tip plate.

35. The bushing of claim 34 wherein a screen area closest to each corner of the bushing has a hole area per unit screen area that is substantially greater than that of the screen area that is closest to a lengthwise centerline of the screen.

36. The bushing of claim 34 wherein screen areas nearest an end wall of the bushing have a substantially higher hole area per unit screen area, in the range of about 10 to about 16 percent, than screen areas in the center portion of the screen, in the range of about 2.5 to about 6 percent.

37. The bushing of claim 20 wherein a screen area closest to each corner of the bushing has a hole area per unit screen area that is substantially greater than that of the screen areas that are closest to a lengthwise centerline of the screen.

38. The bushing of claim 20 wherein screen areas nearest an end wall of the bushing have a substantially higher hole area per unit screen area, in the range of about 10 to about 16 percent, than screen areas in the center portion of the screen, in the range of about 2.5 to about 6 percent.

39. A method of making a bushing for receiving molten material from a bushing leg of a glass tank and for fiberizing the molten material, the bushing comprising at least two opposed sidewalls and at least two opposed end walls, a tip plate having at least 1600 orifices with at least 1600 hollow tips extending from a lower surface of the tip plate and arranged in double rows, attaching the tip plate to the sidewalls and end walls, the bushing having a boxlike shape having at least four interior corners, welding an interior support structure comprising a plurality of intersecting or crossing internal supports with angles between the intersecting supports at each intersection to a top surface of the tip plate to support the tip plate in operation, at least some of the internal supports being attached to one or more of the end walls and at least some of the internal supports being attached to one or more of the sidewalls, the bushing also having linear external supports contacting the bottom of the tip plate and the bushing having a screen in the bushing resting on or mounted near the top of the interior support structure, the screen having a low flow rate center portion and one or more high flow rate portions, the high flow rate portion(s) being adjacent to the center portion and one or more walls of the bushing, the internal support structure, in cooperation with the at least one sidewall and the at least one end wall, forming at least 24 cells located between the bottom of the screen and the top of the plate, the screen having a plurality of screen areas containing holes through the screen with a screen area above each of the cells, adjusting the hole area per unit screen area above each cell such that the hole area per unit screen area in the high flow rate portion(s) of the screen is greater than the hole area per unit screen area in the low flow rate center portion of the screen, to achieve more uniform tip plate temperature profile, and attaching the screen such that the entire bottom of the screen is so close to the top of the interior support structure that the distance from the bottom of the screen to the top of the interior support structure is less than that at which lateral flow of molten glass from one cell to one or more adjacent cells becomes significant to maintaining optimization of the tip plate temperature profile.

40. The method of claim 39 wherein the interior support structure is made of a precious metal or a precious metal alloy, the screen is a first screen and a second screen having holes therethrough is placed in contact with a top of the first screen, at least some of the holes in the second screen aligning with holes in the first screen and the area of the holes per unit area of the second screen is less than the area of holes per unit area of the first screen.

41. The method of claim 40 wherein the interior support structure is made to contain diamond shaped cells and is attached to the sidewalls by welding.

42. The method of claim 40 wherein supports that are part of the interior support structure are made to enter the interior corners of the bushing.

43. The method of claim 40 wherein the internal support structure is made to contain at least 32 cells between the first screen and the tip plate.

44. The method of claim 39 wherein the interior support structure is made to contain diamond shaped cells, and is also attached to the sidewalls by welding and wherein the bushing is fabricated to have 4000 or more tips.

45. The method of claim 44 wherein supports that are part of the interior support structure are made to enter the interior corners of the bushing.

46. The method of claim 44 wherein the internal support structure is made to contain at least 32 cells between the screen and the tip plate.

47. The method of claim 39 wherein supports that are part of the interior support structure are made to enter the interior corners of the bushing.

48. The method of claim 39 wherein the internal support structure is made to contain at least 32 cells between the screen and the tip plate.

49. A bushing for receiving molten material from a bushing leg of a glass tank and for fiberizing the molten material comprising at least two opposed sidewalls and at least two opposed end walls, a tip plate having at least 1600 orifices with at least 1600 hollow tips extending from a lower surface of the tip plate and arranged in double rows, the tip plate being attached to the sidewalls and end walls, the bushing having a boxlike shape having at least four interior corners, an interior support structure comprising a plurality of intersecting or crossing internal supports with angles between the intersection supports at each intersection welded to a top surface of the tip plate for supporting the tip plate, at least some of the internal supports being attached to one or more of the end walls and at least some of the internal supports being attached to one or more of the sidewalls, the bushing also having linear external supports contacting the bottom of the tip plate and a first screen in the bushing, the entire bottom of the first screen resting on, or mounted near, the top of the interior support structure, the interior support structure, in cooperation with the at least one sidewall and the at least one end wall, forming at least 24 cells located between the bottom of the first screen and the top of the tip plate, the first screen having a plurality of screen areas containing holes through the first screen with a screen area above each of the cells, the hole area per unit screen area being different in some screen areas than in other screen areas to achieve more uniform tip plate temperature profile, the first screen being located so close to the top of the interior support structure that the distance from the bottom of the first screen to the top of the interior support structure is less than that at which lateral flow of molten glass from one cell to one or more adjacent cells becomes significant to maintaining optimization of tip plate temperature profile and wherein the interior support structure is made of precious metal or a precious metal alloy and a second screen having holes therethrough is laying on the top of the first screen, at least some of the holes in the second screen aligning with holes in the first screen and the area of the holes per unit area of the second screen is less than the area of holes per unit area of the first screen.

50. The bushing of claim 49 wherein the interior support structure contains diamond shaped cells and is also attached to the sidewalls.

51. The bushing of claim 50 wherein a screen area in the second screen closest to each corner of the bushing has a hole area per unit screen area that is substantially greater than that of the screen area that is closest to a lengthwise centerline of the screen.

52. The bushing of claim 50 wherein screen areas of the second screen nearest an end wall of the bushing have a substantially higher hole area per unit screen area, in the range of about 10 to about 16 percent, than screen areas in the center portion of the screen, in the range of about 2.5 to about 6 percent.

53. The bushing of claim 49 wherein some supports of the interior support structure enter the interior corners of the bushing.

54. The bushing of claim 53 wherein a screen area of the second screen closest to each corner of the bushing has a hole area per unit screen area that is substantially greater than that of the screen area that is closest to a lengthwise centerline of the screen.

55. The bushing of claim 53 wherein screen areas of the second screen nearest an end wall of the bushing have a substantially higher hole area per unit screen area, in the range of about 10 to about 16 percent, than screen areas in the center portion of the screen, in the range of about 2.5 to about 6 percent.

56. The bushing of claim 49 wherein the bushing contains at least 32 cells between the first screen and the tip plate.

57. The bushing of claim 56 wherein a screen area of the second screen closest to each corner of the bushing has a hole area per unit screen area that is substantially greater than that of the screen area that is closest to a lengthwise centerline of the screen.

58. The bushing of claim 56 wherein screen areas of the second screen nearest an end wall of the bushing have a substantially higher hole area per unit screen area, in the range of about 10 to about 16 percent, than screen areas in the center portion of the screen, in the range of about 2.5 to about 6 percent.

59. The bushing of claim 49 wherein a screen area of the second screen closest to each corner of the bushing has a hole area per unit screen area that is substantially greater than that of the screen areas that are closest to a lengthwise centerline of the screen.

60. The bushing of claim 49 wherein screen areas of the second screen nearest an end wall of the bushing have a substantially higher hole area per unit screen area than screen areas closest to a center portion of the screen.

61. A bushing for receiving molten material from a bushing leg of a glass tank and for fiberizing the molten material comprising at least two opposed sidewalls and at least two opposed end walls, a tip plate having at least 1600 orifices with at least 1600 hollow tips extending from a lower surface of the tip plate and arranged in double rows, the tip plate being attached to the sidewalls and end walls, the bushing having a boxlike shape having at least four interior corners, an interior support structure comprising a plurality of intersecting or crossing internal supports with angles between the intersecting supports at each intersection welded to a top surface of the tip plate for supporting the tip plate, at least some of the internal supports being attached to one or more of the end walls and at least some of the internal supports being attached to one or more of the sidewalls, the bushing also having linear external supports contacting the bottom of the tip plate and a first screen in the bushing with the entire bottom of the first screen resting on, or mounted near, the top of the interior support structure, the interior support structure, in cooperation with the at least one sidewall and the at least one end wall, forming at least 32 cells located between the bottom of the screen and the top of the tip plate, the first screen having a plurality of screen areas containing holes through the first screen with a screen area above each of the cells, the hole area per unit screen area being different in some screen areas than in other screen areas to achieve more uniform tip plate temperature profile, the first screen being located so close to the top of the interior support structure that the distance from the bottom of the first screen to the top of the interior support structure is less than that at which lateral flow of molten glass from one cell to one or more adjacent cells becomes significant to maintaining optimization of tip plate temperature profile and wherein the interior support structure is made of a precious metal or a precious metal alloy and a second screen having holes therethrough is laying on the top of the first screen, at least some of the holes in the second screen aligning with holes in the first screen and the area of the holes per unit area of the second screen is less than the area of holes per unit area of the first screen.

62. The bushing of claim 61 wherein the interior support structure contains diamond shaped cells and is also attached to the sidewalls.

63. The bushing of claim 62 wherein a screen area of the second screen closest to each corner of the bushing has a hole area per unit screen area that is substantially greater than that of the screen area that is closest to a lengthwise centerline of the screen.

64. The bushing of claim 62 wherein screen areas of the second screen nearest an end wall of the bushing have a substantially higher hole area per unit screen area, in the range of about 10 to about 16 percent, than screen areas in the center portion of the screen, in the range of about 2.5 to about 6 percent.

65. The bushing of claim 61 wherein supports that are part of the interior support structure enter the interior corners of the bushing.

66. The bushing of claim 65 wherein a screen area of the second screen closest to each corner of the bushing has a hole area per unit screen area that is substantially greater than that of the screen area that is closest to a lengthwise centerline of the screen.

67. The bushing of claim 65 wherein screen areas of the second screen nearest an end wall of the bushing have a substantially higher hole area per unit screen area, in the range of about 10 to about 16 percent, than screen areas in the center portion of the screen, in the range of about 2.5 to about 6 percent.

68. The bushing of claim 61 wherein the bushing contains at least 34 cells between the first screen and the tip plate.

69. The bushing of claim 68 wherein a screen area of the second screen closest to each corner of the bushing has a hole area per unit screen area that is substantially greater than that of the screen area that is closest to a lengthwise centerline of the screen.

70. The bushing of claim 68 wherein screen areas of the second screen nearest an end wall of the bushing have a substantially higher hole area per unit screen area, in the range of about 10 to about 16 percent, than screen areas in the center portion of the screen, in the range of about 2.5 to about 6 percent.

71. The bushing of claim 61 wherein a screen area of the second screen closest to each corner of the bushing has a hole area per unit screen area that is substantially greater than that of the screen areas that are closest to a lengthwise centerline of the screen.

72. The bushing of claim 61 wherein screen areas of the second screen nearest an end wall of the bushing have a substantially higher hole area per unit screen area than screen areas a the center portion of the screen.

\* \* \* \* \*